United States Patent
Park et al.

(10) Patent No.: US 12,456,403 B2
(45) Date of Patent: Oct. 28, 2025

(54) ELECTRONIC DEVICE INCLUDING FLEXIBLE DISPLAY AND METHOD FOR OPERATING ELECTRONIC DEVICE

(71) Applicant: Samsung Electronics Co., Ltd., Suwon-si (KR)

(72) Inventors: Daehee Park, Suwon-si (KR); Junghyung Kim, Suwon-si (KR); Hankon Kim, Suwon-si (KR); Junkyu Park, Suwon-si (KR); Dongil Son, Suwon-si (KR); Jaehoon Song, Suwon-si (KR); Seungbo Shim, Suwon-si (KR); Duhoon Jung, Suwon-si (KR); Myungkyoon Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/296,626

(22) Filed: Apr. 6, 2023

(65) Prior Publication Data

US 2023/0245608 A1 Aug. 3, 2023

Related U.S. Application Data

(63) Continuation of application No. PCT/KR2021/018088, filed on Dec. 2, 2021.

(30) Foreign Application Priority Data

Dec. 4, 2020 (KR) .......................... 10-2020-0168014
Feb. 10, 2021 (KR) .......................... 10-2021-0019120

(51) Int. Cl.
*G09G 3/00* (2006.01)
*G06F 3/041* (2006.01)
(Continued)

(52) U.S. Cl.
CPC ........... *G09G 3/035* (2020.08); *G06F 3/0416* (2013.01); *G06F 3/04845* (2013.01);
(Continued)

(58) Field of Classification Search
CPC ............... G09G 3/035; G09G 2340/04; G09G 2354/00; G06F 3/0416; G06F 3/04845;
(Continued)

(56) References Cited

U.S. PATENT DOCUMENTS 11,057,514 B1 * 7/2021 Noh ....................... G06F 1/1643
2005/0176470 A1 * 8/2005 Yamakawa ............. G09G 3/001
455/566

(Continued)

FOREIGN PATENT DOCUMENTS

CN 108989491 A 12/2018
KR 10-2005-0091420 A 9/2005
(Continued)

OTHER PUBLICATIONS

European Search Report dated Feb. 14, 2014, issued in European Application No. 21901027.9.
(Continued)

*Primary Examiner* — Amy Onyekaba
(74) *Attorney, Agent, or Firm* — Jefferson IP Law, LLP

(57) ABSTRACT

An electronic device is provided. The electronic device includes a first housing, a second housing movable with respect to the first housing, a motor for moving the second housing to be inserted and/or withdrawn with respect to the first housing, a display for displaying a display area having a size changeable according to the movement of the second housing, and a processor operatively connected to the display and the motor and being configured to identify whether a maintenance mode in which the size of the display area is maintained in a determined size is activated, control the
(Continued)

motor to move the second housing according to the state of the electronic device corresponding to the deactivation of the maintenance mode, and maintain the size of the display area to be the determined size corresponding to the activation of the maintenance mode.

17 Claims, 26 Drawing Sheets

(51) Int. Cl.
    *G06F 3/04845*    (2022.01)
    *G06F 3/04847*    (2022.01)
    *G06F 3/0488*    (2022.01)

(52) U.S. Cl.
    CPC ........ *G06F 3/04847* (2013.01); *G06F 3/0488* (2013.01); *G09G 2340/04* (2013.01); *G09G 2354/00* (2013.01)

(58) Field of Classification Search
    CPC .............. G06F 3/04847; G06F 3/0488; G06F 2203/0339; G06F 1/169; G06F 2203/04803; G06F 1/1652; G06F 1/1671; G06F 1/1677; G06F 3/04817; G06F 3/0482; G06F 3/04883; G06F 1/1624; G06Q 10/20

See application file for complete search history.

(56) References Cited

U.S. PATENT DOCUMENTS

| | | | | |
|---|---|---|---|---|
| 2010/0167791 A1* | 7/2010 | Lim | ...................... | G06F 1/1624 |
| | | | | 455/566 |
| 2010/0283713 A1* | 11/2010 | Fein | ...................... | G06F 1/1652 |
| | | | | 345/76 |
| 2011/0248933 A1* | 10/2011 | Griffin | .................. | G06F 1/1622 |
| | | | | 345/173 |
| 2014/0247229 A1* | 9/2014 | Cho | ...................... | G06F 1/1652 |
| | | | | 345/173 |
| 2014/0333545 A1* | 11/2014 | Lee | ...................... | G06F 1/1643 |
| | | | | 345/173 |
| 2015/0015377 A1* | 1/2015 | Bull | .................. | H02J 13/00024 |
| | | | | 340/12.5 |
| 2015/0153777 A1* | 6/2015 | Liu | ...................... | G06F 1/1643 |
| | | | | 345/173 |
| 2015/0220118 A1* | 8/2015 | Kwak | .................... | G09G 5/373 |
| | | | | 345/520 |
| 2016/0034036 A1* | 2/2016 | Ahmed | ................. | G06F 3/1446 |
| | | | | 345/156 |
| 2016/0043335 A1* | 2/2016 | Ahmed | ................... | G06F 3/017 |
| | | | | 345/173 |
| 2017/0140504 A1* | 5/2017 | Jeong | .................... | G06F 1/1677 |
| 2018/0181164 A1* | 6/2018 | Chen | ..................... | G06F 1/1624 |
| 2018/0342225 A1* | 11/2018 | Yun | ..................... | H04N 21/431 |
| 2019/0261519 A1* | 8/2019 | Park | ..................... | G06F 1/1677 |
| 2020/0034026 A1* | 1/2020 | Han | ..................... | G06F 3/0488 |
| 2020/0209923 A1* | 7/2020 | Ahn | ..................... | G06F 1/1652 |
| 2020/0304613 A1* | 9/2020 | Cha | ........................ | G06F 1/1652 |
| 2021/0034210 A1* | 2/2021 | Chung | ................... | G06F 3/0488 |
| 2021/0044683 A1* | 2/2021 | He | ........................ | G06F 1/1652 |
| 2021/0286380 A1* | 9/2021 | Zhong | ................... | G06F 1/1624 |
| 2023/0077374 A1* | 3/2023 | Yang | .................. | G06F 3/04847 |

FOREIGN PATENT DOCUMENTS

| | | |
|---|---|---|
| KR | 10-2011-0063410 A | 6/2011 |
| KR | 10-1562582 B1 | 10/2015 |
| KR | 10-1752750 B1 | 7/2017 |
| KR | 10-2018-0063661 A | 6/2018 |
| KR | 10-2018-0128261 A | 12/2018 |
| KR | 10-2019-0101184 A | 8/2019 |
| KR | 10-2070244 B1 | 1/2020 |
| KR | 10-2105958 B1 | 4/2020 |
| KR | 10-2020-0084480 A | 7/2020 |
| KR | 10-2020-0111083 A | 9/2020 |
| WO | 2019/160345 A1 | 8/2019 |
| WO | 2020/108006 A1 | 6/2020 |

OTHER PUBLICATIONS

International Search Report dated Mar. 3, 2022 issued in International Patent Application No. PCT/KR2021/018088.
Korean Office Action dated Sep. 15, 2025, issued in a Korean Patent Application No. 10-2021-0019120.

* cited by examiner

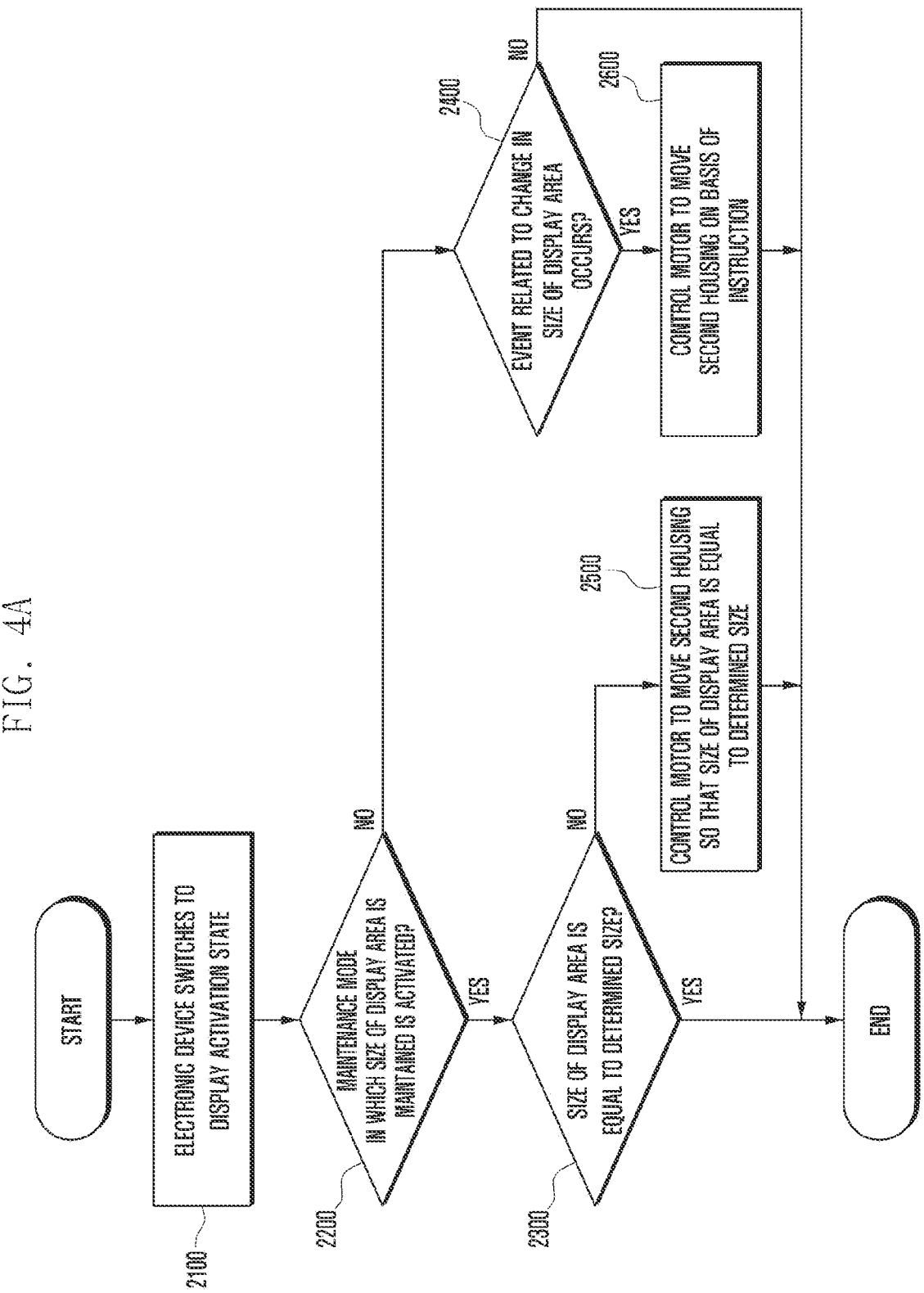

(a)

(b)

(a)

(b)

(a)

(b)

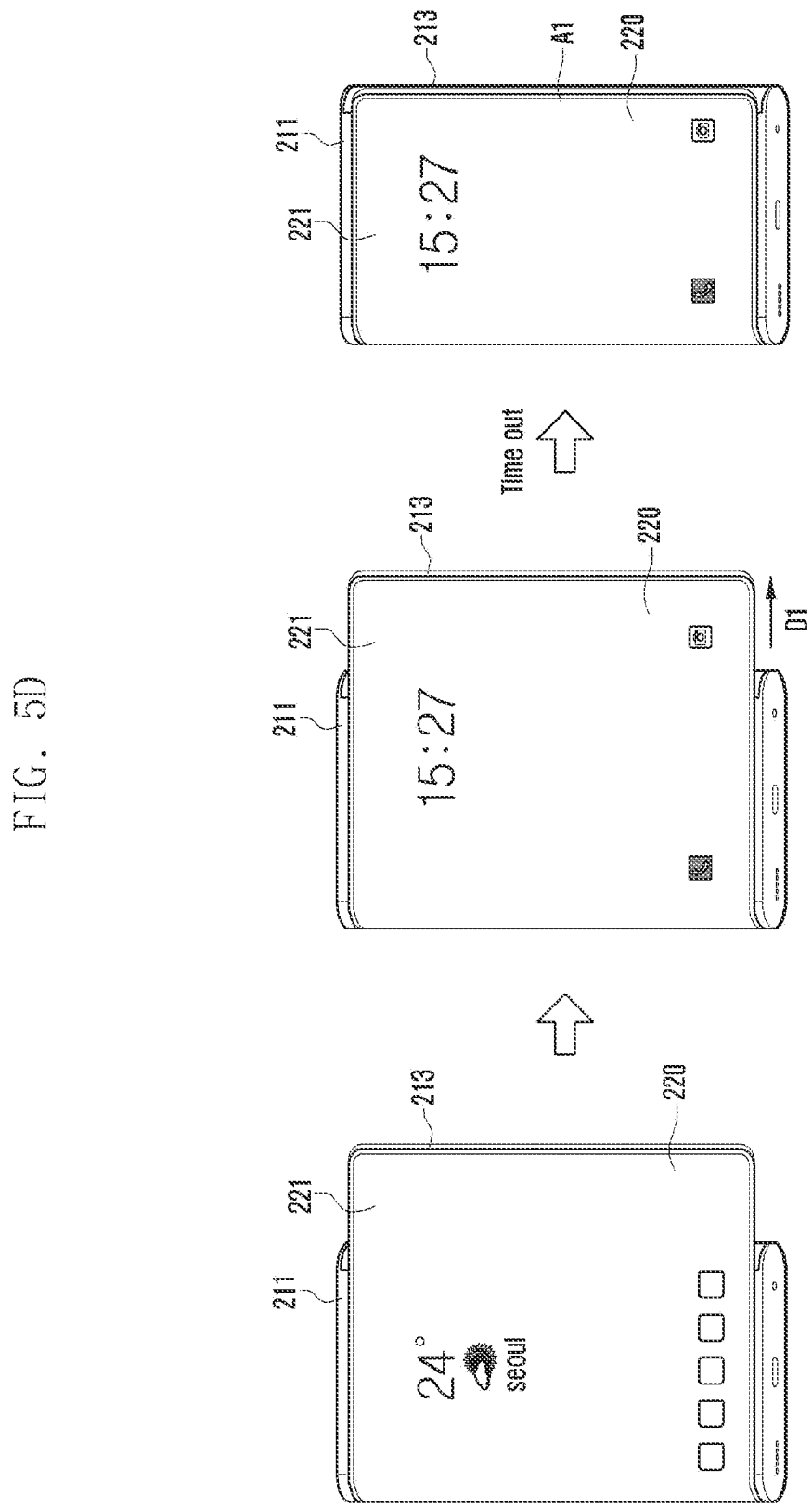

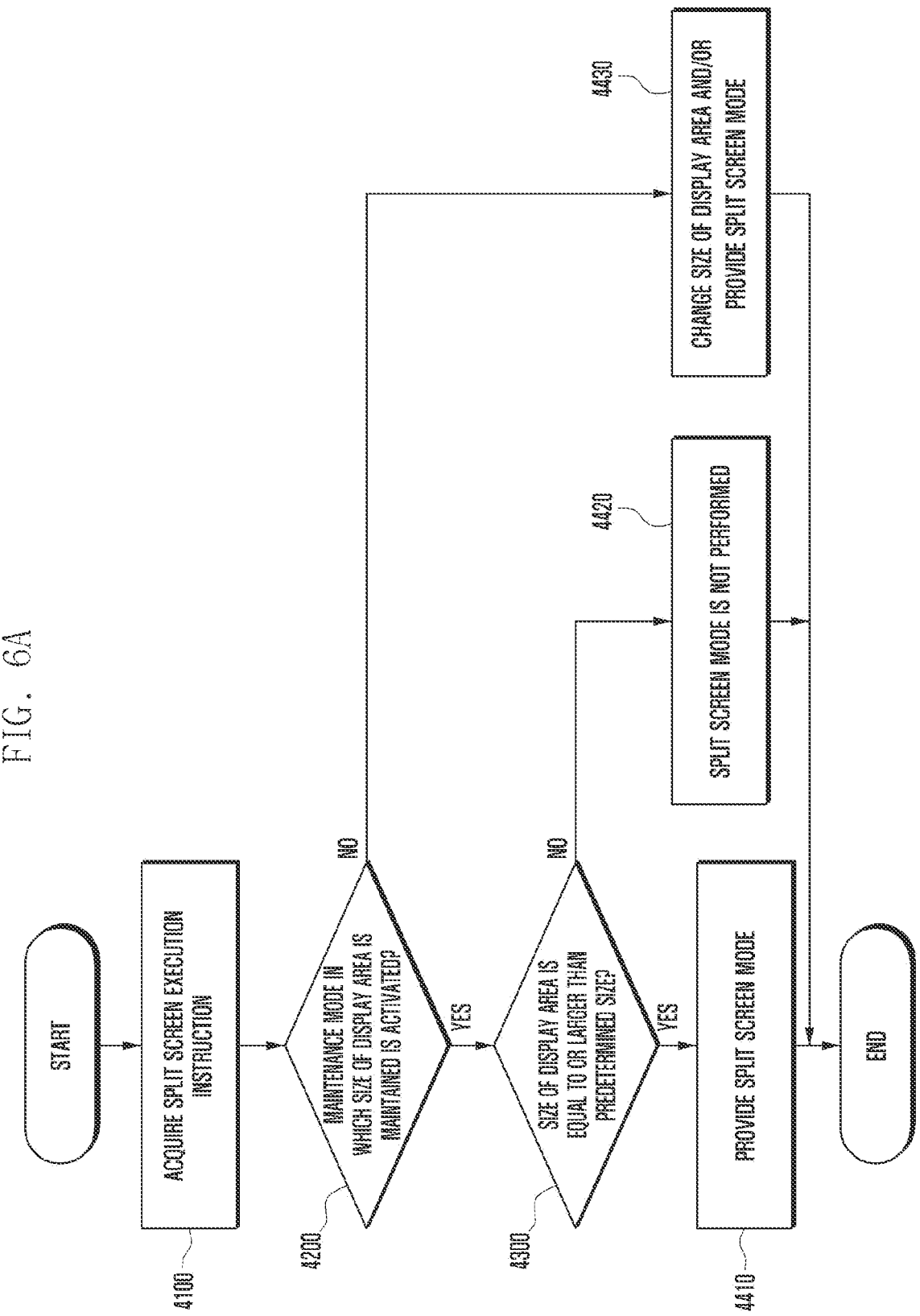

ELECTRONIC DEVICE INCLUDING FLEXIBLE DISPLAY AND METHOD FOR OPERATING ELECTRONIC DEVICE

CROSS-REFERENCE TO RELATED APPLICATION(S)

This application is a continuation application, claiming priority under § 365(c), of an International application No. PCT/KR2021/018088, filed on Dec. 2, 2021, which is based on and claims the benefit of a Korean patent application number 10-2020-0168014, filed on Dec. 4, 2020, in the Korean Intellectual Property Office, and benefit of a Korean patent application number 10-2021-0019120, filed on Feb. 10, 2021, in the Korean Intellectual Property Office, the disclosure of each of which is incorporated by reference herein in its entirety.

BACKGROUND

1. Field

The disclosure relates to an electronic device including a display configured to display a display area having a size that may vary depending on a movement of a housing, and a method of operating the electronic device.

2. Description of Related Art

An electronic device has been implemented by using form factors to provide a relatively large screen while having a size that allows a user to grip the electronic device without feeling discomfort. Among the form factors for the electronic device, a slidable form factor is in the limelight as a next-generation form factor because the slidable form factor may expand a display in a sliding manner.

The sliding manner may include a slide-in manner in which a part of a flexible display is retracted into an internal space of an electronic device or a slide-out manner in which a part of the flexible display is extended from the internal space of the electronic device.

The electronic device implemented by the slidable form factor may have a relatively small size as the flexible display is slid into the electronic device in a state in which a user carries the electronic device. In the slide-out state, the flexible display is slid out of the electronic device, such that the content may be outputted through a relatively large screen.

The above information is presented as background information only to assist with an understanding of the disclosure. No determination has been made, and no assertion is made, as to whether any of the above might be applicable as prior art with regard to the disclosure.

SUMMARY

The appearance of the flexible display allows consumers to expect new forms or concepts of electronic devices to be released. Various manufacturers have launched new concepts of electronic devices to meet the consumers expectation.

Aspects of the disclosure are to address at least the above-mentioned problems and/or disadvantages and to provide at least the advantages described below. Accordingly, an aspect of the disclosure is to provide an electronic device having a new form factor using a flexible display, and various operations capable of being performed by the electronic device.

There has been no specific technology for controlling an electronic device having a new form factor such as an electronic device implemented to have a slidable form factor.

When the electronic device having the new form factor is released, a technical problem to be solved by the manufacturers is to control the electronic device in various aspects, focusing on user convenience.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing configured to be movable relative to the first housing, a motor configured to move the second housing so that the second housing is at least one of retracted or extended relative to the first housing, a display configured to display a display area having a size that varies depending on a movement of the second housing, and a processor operatively connected to the display and the motor, in which the processor is configured to identify whether a maintenance mode is activated, the maintenance mode being a mode in which a size of the display area is maintained at a determined size, in response to identifying that the maintenance mode is activated, maintain the size of the display area at the determined size, and in response to identifying that the maintenance mode is deactivated, control the motor to move the second housing in accordance with a state of the electronic device.

In accordance with another aspect of the disclosure, an electronic device is provided. The electronic device includes a first housing, a second housing configured to be movable relative to the first housing, a motor configured to move the second housing so that the second housing is at least one of retracted or extended relative to the first housing, a display configured to display a display area having a size that varies depending on a movement of the second housing, and a processor operatively connected to the display and the motor, in which the processor is configured to identify a designated input including an instruction to contract the display area, and, in response to the designated input, control the motor to at least one of move or fix the second housing so that the second housing is maximally retracted.

It is possible to implement interest and provide a new use environment by providing the electronic device with a new form factor. In addition, it is possible to allow the user to more conveniently use the electronic device by providing a new interface using a new form factor.

On the basis of user convenience, it is possible to provide a technology for controlling the electronic device having a new form factor.

In the case of the device including the flexible display in which the size of the display area varies, it is possible to prevent the display area from being expanded or contracted regardless of the user's intention.

For example, it is possible to provide user convenience because the display area is expanded to have a desired size even though the user does not perform a separate operation in response to the condition in which the display switches to the activation state.

For example, it is possible to efficiently manage the electronic device by maintaining the size of the display area in response to the condition in which the display switches to the deactivation state.

For example, in case that the time for which the display switches to the deactivation state is equal to or longer than a predetermined time, the size of the display area is changed to a minimum size, which makes it possible to improve safety of the electronic device.

For example, the time is not required to expand and/or contract the display area regardless of the user's intention, which makes it possible to efficiently manage the device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A is a flowchart illustrating an operation of controlling, by a processor, an electronic device in response to a condition in which the electronic device switches to a display activation state according to an embodiment of the disclosure;

FIGS. 5B, 5C, and 5D are views illustrating examples of operations of an electronic device in accordance with the flowchart in FIG. 5A according to various embodiments of the disclosure;

FIG. 6A is a flowchart illustrating an operation of providing, by a processor, a split screen mode in response to a condition in which an electronic device acquires a split screen execution instruction according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
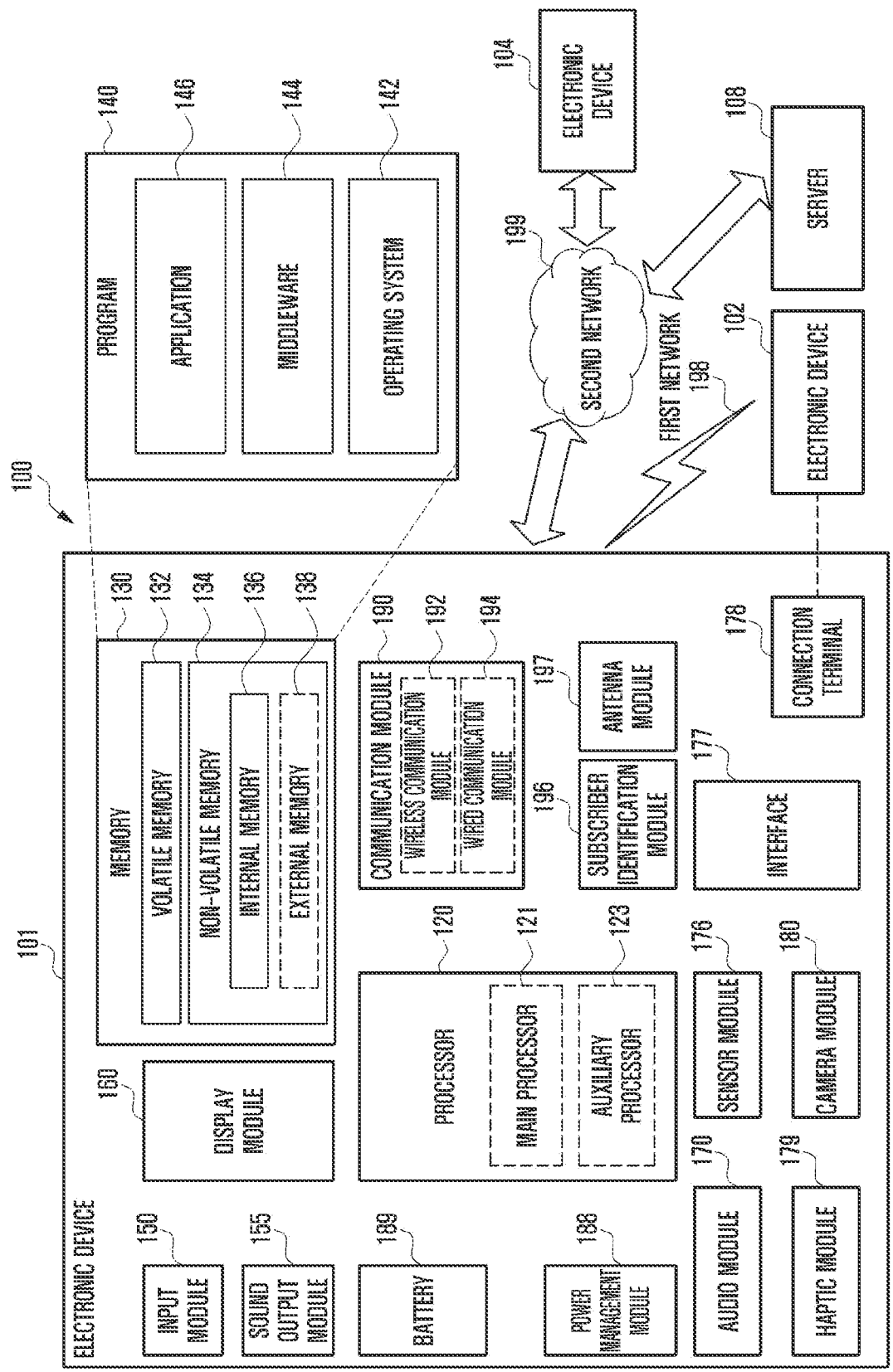
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
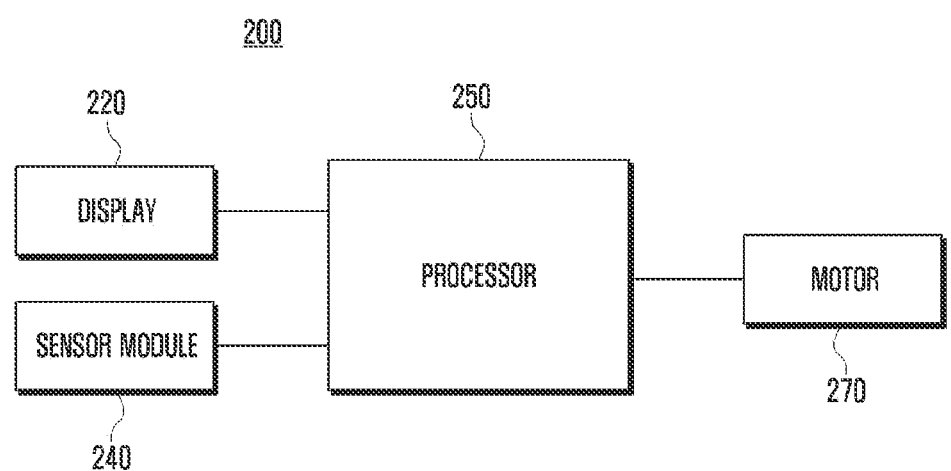
FIG. 2A is a block diagram of an electronic device according to an embodiment of the disclosure.

FIG. 2A is a block diagram of the electronic device according to an embodiment of the disclosure.

Referring to FIG. 2A, an electronic device 200 (e.g., the electronic device 101 in FIG. 1) may include a processor 250 (e.g., the processor 120 in FIG. 1), a display 220 (e.g., the display module 160 in FIG. 1), a sensor module 240 (e.g., the sensor module 176 in FIG. 1), and/or a motor 270. The constituent elements included in FIG. 2A are some of the constitutions included in the electronic device 200, and the electronic device 200 may include various constituent elements illustrated in FIG. 1 in addition to the constituent elements.

According to various embodiments, the processor 250 may be the processor 120 described with reference to FIG. 1. The display 220 may be the display module 160 described with reference to FIG. 1. The processor 250 may be connected to the display 220 and process various pieces of information so that the information may be visually displayed on the display 220. The processor 250 may be connected to the sensor module 240 and receive various pieces of information measured by the sensor module 240. In addition, the processor 250 may be connected to the motor 270 and control the motor 270.

According to various embodiments, the electronic device 200 may include a first housing (e.g., a first housing 211 in FIG. 2B), and a second housing (e.g., a second housing 213 in FIG. 2B) installed to be slidable relative to the first housing 211.

According to various embodiments, the sensor module 240 may include at least one sensor. For example, the sensor module 240 may include a distance sensor capable of measuring a distance between the first housing 211 and the second housing 213. The distance sensor may be a sensor that measures a degree to which the second housing 213 is expanded as the second housing 213 slides relative to the first housing 211.

According to various embodiments, the sensor module 240 may include a distance sensor capable of measuring a distance from the second housing 213 to an obstacle in a direction in which the second housing 213 is expanded.

In the embodiment, the distance sensors included in the sensor module 240 may include at least one of an optical distance sensor, an ultrasonic distance sensor, and a radio wave type distance sensor. In addition, the distance sensor may include various sensors capable of measuring a distance or displacement.

According to various embodiments, the distance sensor may measure a degree to which the housing is expanded and/or a distance to the obstacle in various ways. In the embodiment, the distance sensor may measure a distance in a time of flight (TOF) manner. The distance sensor may measure a distance by using the time for which light or a radio wave outputted from the distance sensor is reflected by another object and returned. In the embodiment, the distance sensor may measure a distance by using a light amount measurement method. The distance sensor, which may measure a distance by using the light amount measurement method, measures a distance on the basis of the amount of light entering the distance sensor. The distance sensor may determine that the distance increases as the light amount received by the distance sensor decreases, and the distance decreases as the light amount received by the distance sensor increases. In the embodiment, the distance sensor may measure a distance by using a method of analyzing a light pattern emitted to and displayed on a particular object. The distance sensor may measure a distance between two points in the light pattern displayed on the particular object. It can be determined that the distance between the distance sensor and the particular object increases as an interval between the two points decreases, and the distance between the distance sensor and the particular object decreases as the interval between the two points increases. In addition, the distance sensor may measure a distance in various ways.

According to various embodiments, the sensor module 240 may include an expansion detection sensor that may detect the expansion of the second housing 213. The expansion detection sensor may measure a state based on a distance between the second housing 213 and the first housing 211. In the embodiment, the expansion detection sensor may generate an electrical signal on the basis of a degree to which the second housing 213 is expanded. For example, the expansion detection sensor may be a Hall sensor configured to detect a change in magnetic field in accordance with the expansion of the housing, a sensor configured to detect an interaction of a magnet, a sensor configured to detect a pushed state of a physical switch, or a sensor configured to detect contact between terminals. The expansion detection sensor may detect a state in which the second housing 213 is maximally extended, a state in which the second housing 213 is retracted, or an intermediate state.

According to various embodiments, the sensor module 240 may include a pressure sensor. The pressure sensor may measure pressure applied to the electronic device 200. In the embodiment, the pressure sensor may be installed on at least one surface, among an upper surface, a lower surface, a rear surface, and/or a side surface of the electronic device 200, and measure a magnitude and/or a direction of pressure applied to the electronic device 200.

According to various embodiments, the sensor module 240 may include a grip sensor. The grip sensor may detect whether the electronic device 200 is gripped. In the embodiment, the grip sensor may detect (or sense or identify) capacitance (or a change in capacitance) that is changed by an external object (e.g., a human body or an object) that approaches or comes into contact with the electronic device 200. In the embodiment, in case that the external object approaches or comes into contact with the electronic device 200, the capacitance detected by the grip sensor may vary depending on the external object (or permittivity of the external object). For example, in case that the human body approaches or comes into contact with the electronic device 200, the grip sensor may detect capacitance having first intensity. In case that an external electronic device (e.g., a pad for wireless charging) approaches or comes into contact with the electronic device 200, the grip sensor may detect capacitance having intensity equal to or lower than the first intensity.

Figure 2B:
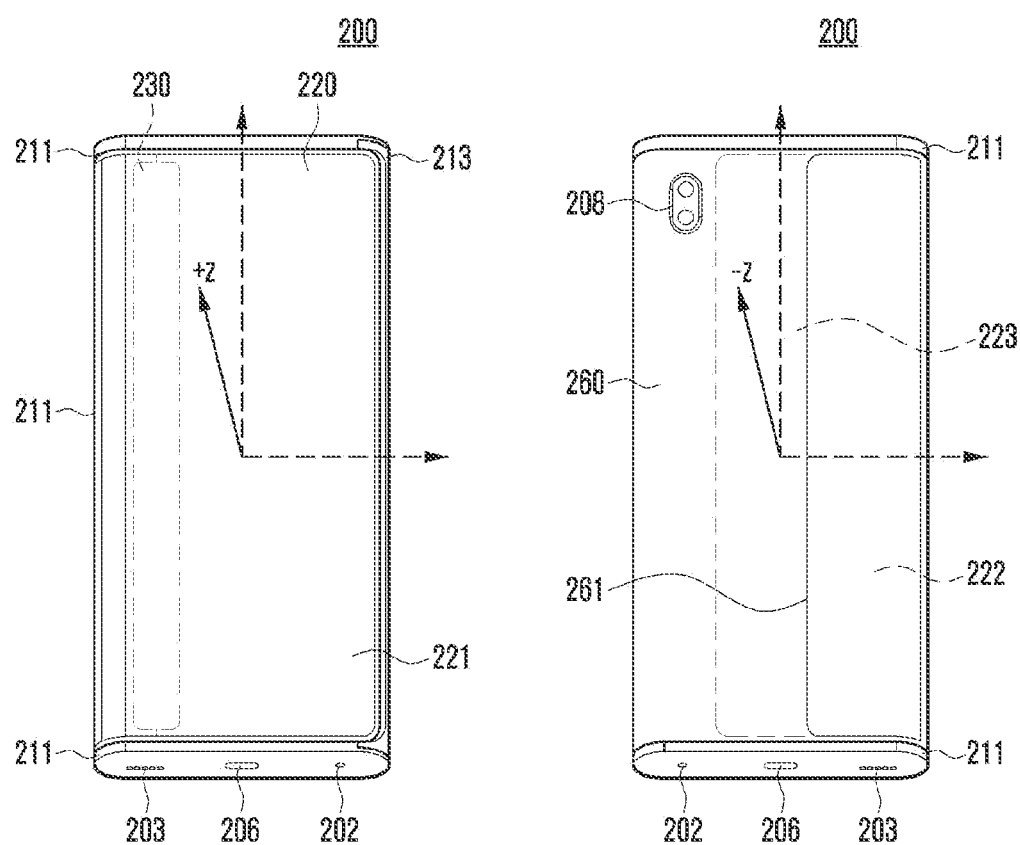
FIG. 2B is a front/rear perspective view of an electronic device according to an embodiment of the disclosure.
Figure 2C:
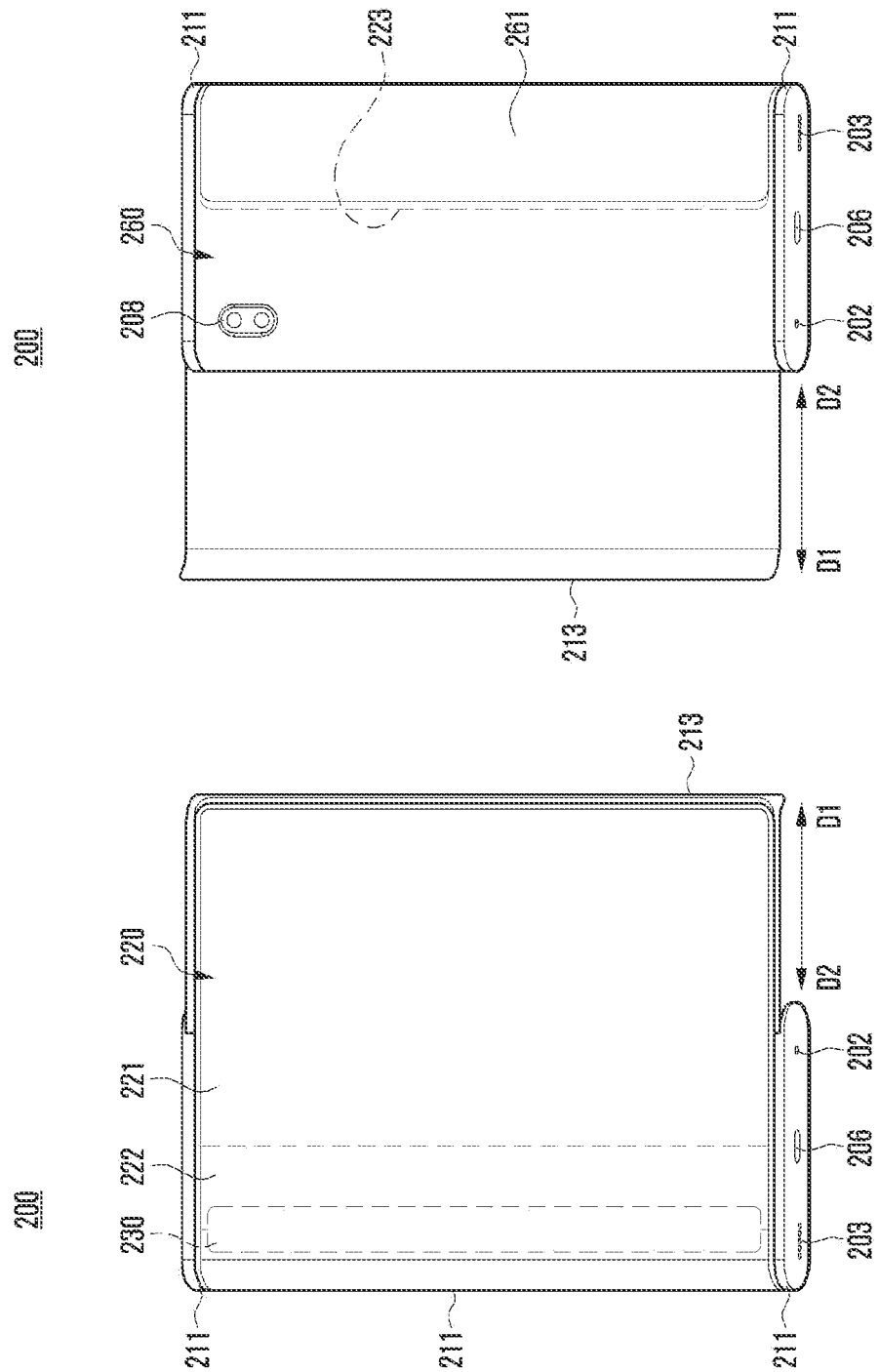
FIG. 2C is a front/rear perspective view illustrating a state in which a housing of the electronic device illustrated in FIG. 2B is expanded according to an embodiment of the disclosure.

FIG. 2B is a front/rear perspective view of the electronic device according to an embodiment of the disclosure, and FIG. 2C is a front/rear perspective view illustrating a state in which the housing of the electronic device illustrated in FIG. 2B is expanded according to an embodiment of the disclosure.

Referring to FIGS. 2A and 2B, the electronic device 200 according to various embodiments of the disclosure may be the electronic device 200 including the display 220 having the display area (e.g., a display area 221 in FIG. 2B) having a size that may vary visually to the outside. The display area 221 may be an area in which visual information may be displayed. According to various embodiments, the electronic device 200 may display a large number of pieces of information on the display 220 as the size of the display area 221 of the display 220 increases. The structure of the housing of the electronic device 200, which will be described below, is just an example of the electronic device in which the size of the display area 221 may vary. In addition, the size of the display area 221 of the display 220 may vary in various ways.

According to various embodiments, the electronic device 200 may include a slidable housing (e.g., the first housing 211 and the second housing 213). Referring to FIG. 2A, the electronic device 200 may include the first housing 211, the second housing 213, and the display 220.

According to various embodiments, the display 220 may be a flexible display. The display area 221 of the display 220 may be expanded or contracted as the second housing 213 moves relative to the first housing 211. For example, the display area 221 of the display 220 may be expanded as the second housing 213 moves relative to the first housing 211 in a first direction (e.g., first direction D1 in FIG. 2C) based on FIG. 2B, and the display area 221 of the display 220 may be contracted as the second housing 213 moves relative to the first housing 211 in a second direction (e.g., second direction D2 in FIG. 2C). At least one partial area (e.g., the display area 221 in FIG. 2B) of the display 220 may constitute the front surface of the electronic device 200. At least one partial area (e.g., the display area 221) may be visually exposed to the outside, and the remaining area (e.g., a second area 222 and/or a third area 223 in FIG. 2B) may be accommodated in the electronic device 200. The front surface may mean a surface directed in a +Z direction based on FIG. 2B. For example, the display area 221 of the display 220 may constitute the front surface of the electronic device 200 based on FIG. 2B. At least one partial area (e.g., the display area 221) may be visually exposed to the outside, and the second area 222 and the third area 223 may be at least partially accommodated in the electronic device 200. The second area 222 and the third area 223 may be visually exposed to the outside as the second housing 213 moves relative to the first housing 211.

According to various embodiments, a rear surface cover 260 of the electronic device 200 may cover the rear surface of the electronic device 200. The rear surface of the electronic device 200 may be a surface directed in a direction opposite to the front surface of the electronic device. In this case, the rear surface may be a surface directed in a −Z direction based on FIG. 2B. In the embodiment, the rear surface cover 260 may include a transparent area 261. The transparent area 261 may be one area of the rear surface cover 260 made of a transparent material. In this case, the partial area (e.g., the second area 222 and/or the third area 223) of the display 220 accommodated in the electronic device 200 may be visually visible to the outside of the electronic device 200 through the transparent area 261.

According to various embodiments, the first housing 211 may accommodate the display 220. For example, a recess may be formed in a front surface of the first housing 211 and accommodate a part of the display 220. In this case, the front surface may mean a surface directed in the +Z direction based on FIG. 2B. According to the embodiment, at least a part of the first housing 211 may be made of a metallic material or a nonmetallic material having rigidity of a magnitude configured to support the display 220.

According to various embodiments, the second housing 213 may be coupled to be slidable relative to the first housing 211. For example, as illustrated in FIG. 2C, the second housing 213 may slide in the first direction (e.g., first direction D1 in FIG. 2C) or the second direction (e.g., second direction D2 in FIG. 2C). At least one partial area of the second housing 213 may be fixed to the display 220. At least a part of the second housing 213 may be made of a metallic material or a nonmetallic material having rigidity of a magnitude configured to support the display 220.

According to various embodiments, the electronic device 200 may include the motor (e.g., the motor 270 in FIG. 2A) in the housing. According to various embodiments, the processor (e.g., the processor 120 in FIG. 1 or the processor 250 in FIG. 2A) may control the display 220 and the motor 270 (e.g., the motor 270 in FIG. 2A). According to various embodiments, the motor 270 may be constituted to slide the second housing 213 relative to the first housing 211.

According to the embodiment, the processor 250 of the electronic device 200 may transmit a control signal to the motor 270.

According to the embodiment, the motor 270 may operate in response to at least one of a plurality of control signals transmitted from the processor. For example, the motor 270 may receive a control signal from the processor in case that various events (e.g., execution of an application) occur in the electronic device 200.

According to the embodiment, the motor 270 may be installed in any one of the first housing 211 and the second housing 213 and slide the second housing 213 relative to the first housing 211 in response to at least one of the plurality of control signals transmitted from the processor. According to the embodiment, the motor 270 may be substituted with various constitutions that slide the second housing 213 relative to the first housing 211. According to the embodiment, various types of actuators may be used. For example, it is possible to use an actuator that may operate a cylinder that performs a rectilinear motion.

According to various embodiments, a sliding shaft 230 may be disposed in the electronic device 200. The sliding shaft 230 may guide the expansion or contraction of the display 220 made by the sliding motion of the second housing 213 relative to the first housing 211. The area (e.g., the second area 222 and the third area 223) of the display accommodated in the electronic device 200 may be moved to the front surface of the electronic device 200 while passing the sliding shaft 230 and be visible to the front surface of the electronic device 200. In the embodiment, the sliding shaft 230 may be rotated by the operation of the motor 270. The second housing 213 may be slid relative to the first housing 211 by the rotation of the sliding shaft 230.

In another embodiment, the sliding shaft 230 may be constituted to guide the motion of the display 220 made by the sliding motion of the second housing 213. The sliding shaft 230 may guide the display 220 so that the display 220 does not deviate from the sliding motion.

According to various embodiments, the electronic device 200 may further include a front surface camera module (not illustrated) visually exposed to the front surface of the electronic device 200, and a rear surface camera module 208 visually exposed to the rear surface.

According to various embodiments, the electronic device 200 may further include a connector hole 206. The connector hole 206 may include a first connector hole 206 capable of accommodating a connector (e.g., a USB connector) for transmitting or receiving electric power and/or data to or from the external electronic device, and/or a second connector hole (not illustrated) (e.g., an earphone jack) capable of accommodating a connector for transmitting or receiving an audio signal to or from the external electronic device.

According to various embodiments, the electronic device 200 may further include an audio module (e.g., microphone hole 202 and/or speaker hole 203). The audio module (e.g., microphone hole 202 and/or speaker hole 203) may include the microphone hole 202 and/or the speaker hole 203. A microphone may be disposed in the microphone hole 202 for acquiring outside sound. The speaker holes 203 may include the external speaker hole 203 and/or a telephone receiver hole (not illustrated). In another embodiment, the speaker hole 203 and the microphone hole 202 may be implemented as a single hole, or a speaker (e.g., a piezoelectric speaker) may be included without the speaker hole 203. In the electronic device 200 according to various embodiments of the disclosure, a size of the display area 221 of the display 220 may vary. As described above, the change in size of the display area 221 may be implemented by the sliding motion of the display 220.

Figure 3:
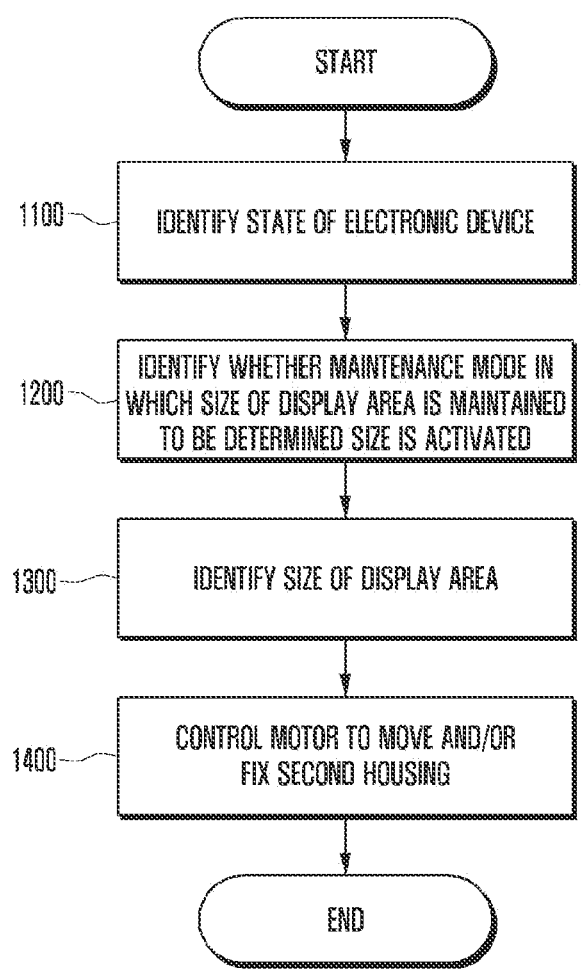
FIG. 3 is a flowchart illustrating a method of controlling, by a processor, an electronic device according to an embodiment of the disclosure.

FIG. 3 is a flowchart illustrating a method of controlling, by the processor, the electronic device according to an embodiment of the disclosure.

According to various embodiments, the electronic device (e.g., the electronic device 200 in FIG. 2B) may include a rollable type and/or slidable type electronic device in which the display area (e.g., the display area 221 in FIG. 2B) of the display (e.g., the display 220 in FIG. 2B) is expanded or contracted by the movement of the second housing (e.g., the second housing 213 in FIG. 2B) from the first housing (e.g., the first housing 211 in FIG. 2B).

Referring to FIG. 3, according to various embodiments, in operation 1100, the processor (e.g., the processor 250 in FIG. 2A) may identify states of the electronic device 200.

According to various embodiments, the states of the electronic device 200 may include: display deactivation states including a state in which the display 220 is in a screen-off state and/or a state in which a screen-lock screen is displayed; display activation states include a state in which the electronic device 200 is unlocked and the display 220 is in a screen-on state; and a power-off state. According to the embodiment, the electronic device 200 may switch from the display deactivation state to the display activation state in response to a received designated user input. The designated user input may be a user input on the display 220, or a user input through various components (e.g., a hardware button) included in the electronic device 200. According to the embodiment, the electronic device 200 may receive user identification and/or certification based on a user's bio-information (e.g., the user's iris, face, or fingerprint) and switch to the display activation state in response to a condition in which the received user's bio-information is coincident with stored bio-information.

According to the embodiment, the electronic device 200 may switch from the display activation state to the display deactivation state in response to a situation in which a designated condition is satisfied in the display activation state. The designated condition may include varies conditions including: a condition in which the electronic device 200 does not receive a separate user input for the time equal to or longer than the time designated in the display activation state; and/or a condition in which the electronic device 200 receives a user input that requests the electronic device 200 to switch to the display deactivation state.

According to the embodiment, the electronic device 200 may switch from the display deactivation state and/or the display activation state to the power-off state in response to a situation in which the designated condition is satisfied. The designated condition may include various conditions including various user inputs that request the electronic device 200 to switch to the power-off state (e.g., selection of a finish icon in the display, an input of a hardware button provided on the electronic device 200, or a designated gesture) and/or a lack of a battery of the electronic device 200.

According to various embodiments, in operation 1200, the processor 250 may identify whether a maintenance mode in which a size of the display area 221 is maintained to be a determined size is activated.

According to the embodiment, the maintenance mode may be an operating mode in which a size of the display area is changed to the determined size when the electronic device 200 is in the display activation state, and the display area is decreased when the electronic device 200 is in the power-off state. For example, the maintenance mode may be an operating mode in which a size of the display area 221 is maintained without being changed in the display activation state. According to the embodiment, the maintenance mode may be described as a sliding mode, a sliding fixing mode, and a sliding fixing on/off mode.

The processor 250 may maintain a size of the display area 221 as the determined size in response to the activation of the maintenance mode. The processor 250 may change the size of the display area 221 depending on the state of the electronic device 200 in response to the deactivation of the maintenance mode. According to the embodiment, the deactivation of the maintenance mode may be a default state of the electronic device 200.

According to the embodiment, the determined size may be a size of the display area 221 when the maintenance mode is activated. According to the embodiment, the determined size may be a size when the size of the display area 221 is minimized in response to a state (slide-in state) in which the second housing 213 is maximally retracted. According to the embodiment, the determined size may be a size when the size of the display area 221 is maximized in response to a state (slide-out state) in which the second housing 213 is maximally extended.

According to the embodiment, the determined size may be a size designated by the user between the state (slide-in state) in which the second housing 213 is maximally retracted and the state (slide-out state) in which the second housing 213 is maximally extended.

The electronic device 200 may include user interfaces (UIs) having various shapes through which inputs related to the maintenance mode may be acquired from the user. The UIs described in the document may include various UIs in the form of software and/or hardware. The UIs according to various embodiments may include UIs in the forms illustrated in FIGS. 7A to 7E.

According to various embodiments, in operation 1300, the processor 250 may identify a size of the display area 221.

According to various embodiments, the sensor module 240 may include a distance sensor capable of measuring a distance between the first housing 211 and the second housing 213. The sensor module 240 including the distance sensor may measure a degree to which the space between the first housing 211 and the second housing 213 is expanded as the second housing 213 slides relative to the first housing 211. According to the embodiment, the processor 250 may identify a size of the display area 221 on the basis of the distance between the first housing 211 and the second housing 213 measured by the sensor module 240.

According to various embodiments, the sensor module 240 may include an expansion detection sensor that may detect the expansion of the second housing 213. The sensor module 240 including the expansion detection sensor may measure a state based on the distance between the second housing 213 and the first housing 211. In the embodiment, the expansion detection sensor may generate an electrical signal on the basis of a degree to which the second housing 213 is expanded. According to the embodiment, the processor 250 may identify a size of the display area 221 on the basis of the degree to which the second housing 213 is expanded, the degree being measured by the sensor module 240.

According to various embodiments, the sensor module 240 may include an overload detection sensor capable of detecting an overload of the motor 270. The sensor module 240 including the overload detection sensor may detect an overload state of the motor 270 in case that the expansion of the second housing 213 is obstructed (e.g., the electronic device 200 is trapped in a narrow space) and in case that the amount of electric current to be supplied to the motor 270 is equal to or larger than a designated amount while the second housing 213 is expanded by the operation of the motor 270.

According to various embodiments, in operation 1400, the processor 250 may control the motor 270 to move and/or fix the second housing 213 on the basis of the state of the electronic device 200, whether the maintenance mode is activated, and the identification of the size of the display area 221. For example, the processor 250 may control the motor 270 to move the second housing 213 when the electronic device 200 switches to the display activation state, the maintenance mode is activated, and the size of the display area 221 is not the determined size. As another example, the processor 250 may control the motor 270 to fix (e.g., maintain) the second housing 213 when the electronic device 200 switches to the display activation state, the maintenance mode is activated, and the size of the display area 221 is the determined size.

According to the embodiment, the processor 250 may control the motor 270 by providing power and/or a signal to the motor 270 to move the second housing 213 when the size of the display area 221 is not the determined size in the maintenance mode selected by the user. As another example, the processor 250 may control the motor 270 by blocking power and/or a signal, which is to be provided to the motor 270, to fix (e.g., maintain) the second housing 213 when the size of the display area 221 is the determined size in the maintenance mode selected by the user.

According to the embodiment, the processor 250 may determine whether the movement of the second housing 213 is obstructed before controlling the motor 270 to move the second housing 213. A situation in which the movement of the second housing 213 is obstructed may mean that the second housing 213 cannot be moved by a designated length because of an external object. The processor 250 may identify a movement distance of the second housing 213 in response to the operation of controlling the motor (e.g., the motor 270 in FIG. 2A) to move the second housing 213 by the designated length. The processor 250 may determine that the movement of the second housing 213 is obstructed in response to a condition in which the movement distance of the second housing 213 is smaller than the designated length by a predetermined value or more.

According to the embodiment, the processor 250 may determine whether the movement of the second housing 213 is obstructed while controlling the motor 270 to move the second housing 213. For example, the processor may determine whether the movement of the second housing 213 is obstructed in case that the sensor module 240 detects that the amount of electric current to be supplied to the motor 270 is equal to or larger than the designated amount (e.g., the overload state). According to various embodiments, the case in which the movement of the second housing 213 is obstructed may include a case in which an obstacle is present in the first direction D1 and the movement of the second housing 213 in the first direction D1 is obstructed, such as a case in which the user grips the electronic device 200 in the first direction D1 or a case in which a surface of the second housing 213 of the electronic device 200 is in contact with the ground surface.

According to various embodiments, the sensor module 240 may include: a motor sensor configured to detect a load equal to or higher than predetermined torque of the motor 270; a pressure sensor configured to detect pressure applied to the electronic device 200; a grip sensor configured to detect whether the electronic device 200 is gripped; and/or a distance sensor configured to detect a distance between an obstacle and the second housing 213 of the electronic device 200. The sensor module 240 may detect whether the movement of the second housing 213 is obstructed. The sensor module 240 may provide the processor 250 with data, which indicate that the movement of the second housing 213 is obstructed, in response to the condition in which the obstruction of the movement of the second housing 213 is detected. The processor 250 may determine the presence or absence of obstruction on the basis of the data transmitted by the sensor module 240. The processor 250 may not control the operation of the motor 270 in response to the determination of the presence of the obstruction of the movement of the second housing 213.

Figure 4B:
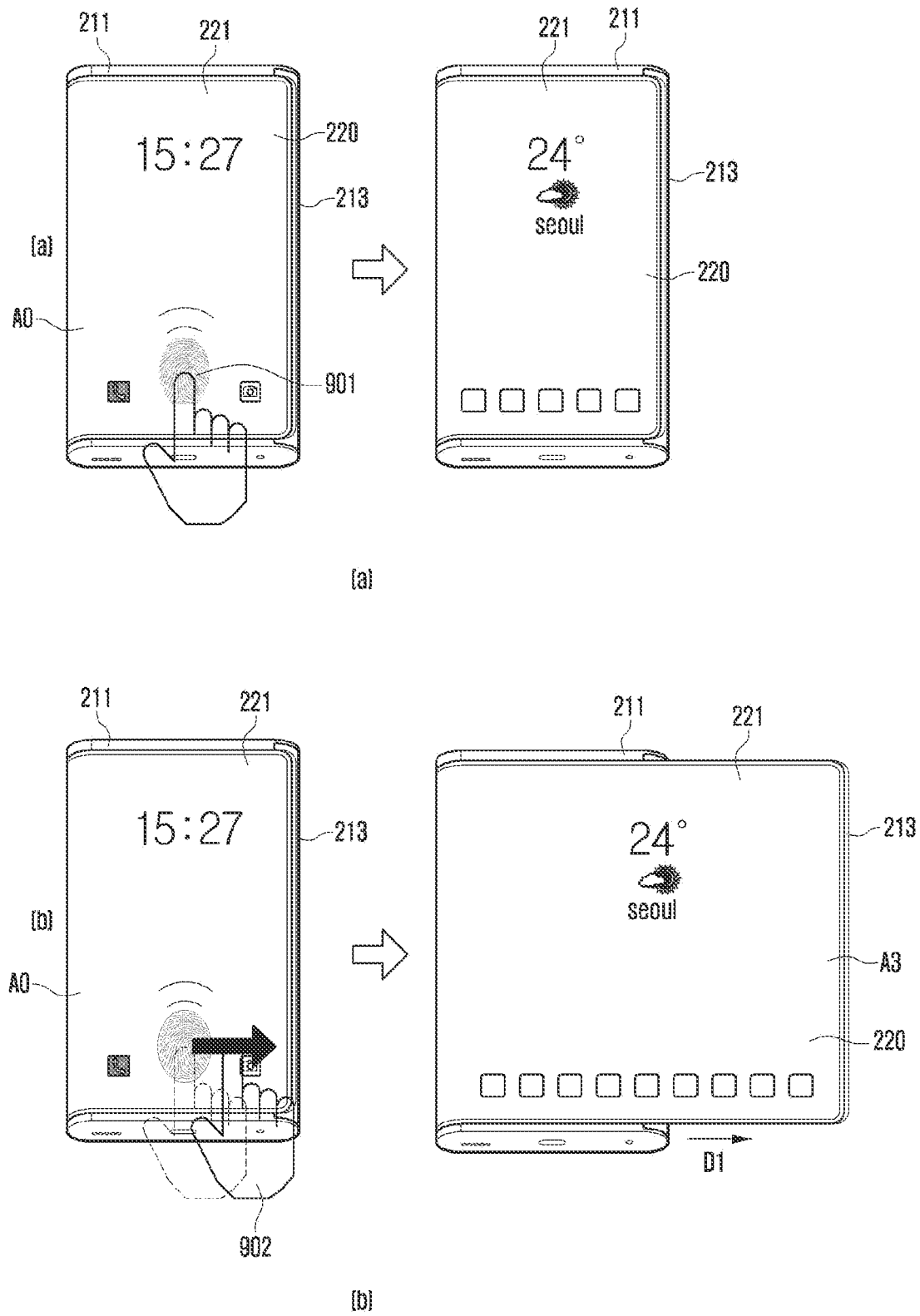
FIGS. 4B, 4C, 4D, and 4E are views illustrating examples of operations of an electronic device in accordance with the flowchart in FIG. 4A according to various embodiments of the disclosure.

FIG. 4A is a flowchart illustrating an operation of controlling, by the processor (e.g., a processor of FIG. 2A), an electronic device (e.g., an electronic device of FIG. 2A) in response to the condition in which the electronic device switches to the display activation state according to an embodiment of the disclosure. FIGS. 4B, 4C, 4D, and 4E are views for explaining examples of operations of an electronic device in accordance with the flowchart in FIG. 4A according to various embodiments of the disclosure.

According to various embodiments, the processor 250 may be configured to maintain the size of the display area 221 and/or control the motor (e.g., the motor 270 in FIG. 2A) to move the second housing (e.g., the second housing 213 in FIG. 2B) on the basis of the size of the display area 221 and whether the maintenance mode in which the size of the display area (e.g., the display area 221 in FIG. 2B) is maintained is activated in response to the condition in which the electronic device 200 switches to the display activation state.

Referring to FIGS. 4A to 4E, according to various embodiments, in operation 2100, the processor 250 may identify whether the electronic device 200 switches to the display activation state.

According to the embodiment, the electronic device 200 may switch from the display deactivation state to the display activation state in response to a received designated user input. The designated user input may be a user input on the display 220, or a user input through various components (e.g., a hardware button) included in the electronic device 200. The electronic device 200 may receive user identification and/or certification based on a user's bio-information (e.g., the user's iris, face, or fingerprint) and switch to the activation state in response to a condition in which the received user's bio-information is coincident with stored bio-information.

According to various embodiments, in operation 2200, the processor 250 may determine whether the maintenance mode in which the size of the display area 221 is maintained is activated in response to the condition in which the electronic device 200 switches to the display activation state.

According to various embodiments, in operation 2300, the processor 250 may determine whether the size of the display area 221 is equal to the determined size in response to the activation of the maintenance mode (e.g., YES in operation 2200).

According to the embodiment, the determined size may be a size of the display area 221 when the maintenance mode is activated. According to the embodiment, the determined size may be a size when the size of the display area 221 is minimized in response to a state (slide-in state) in which the second housing 213 is maximally retracted. According to the embodiment, the determined size may be a size when the size of the display area 221 is maximized in response to a state (slide-out state) in which the second housing 213 is maximally extended.

The processor 250 may maintain the size of the display area 221 as the determined size in response to the condition in which the size of the display area 221 is equal to the determined size (e.g., YES in operation 2300). According to the embodiment, the processor 250 may end the operation without controlling the operation of the motor 270.

In operation 2500, in response to the condition in which the size of the display area 221 is different from the determined size (e.g., NO in operation 2300), the processor 250 may control the motor 270 to move the second housing 213 so that the size of the display area 221 is equal to the determined size. According to the embodiment, in case that the size of the display area 221 is larger than the determined size, the processor 250 may control the motor 270 to move the second housing 213 in the retraction direction (e.g., the second direction D2 in FIG. 2C) so that the size of the display area 221 is equal to the determined size. According to the embodiment, in case that the size of the display area 221 is smaller than the determined size, the processor 250 may control the motor 270 to move the second housing 213 in the extension direction (e.g., the first direction D1 in FIG. 2C) so that the size of the display area 221 is equal to the determined size.

In operation 2400, the processor 250 may determine whether various events including an instruction to change a size of the display area 221 of the display 220 occur in response to the deactivation of the maintenance mode (e.g., NO in operation 2200). According to various embodiments, the events may be various events including the user's selection of the expansion or contraction of the display area 221 through various UIs, the selection of the view all of a photograph and/or a video, and the execution of a predetermined application and/or the rotation of the electronic device 200 for expanding or contracting the display area 221 during the execution.

According to the embodiment, in operation 2600, the processor 250 may control the motor 270 to move the second housing 213 on the basis of the instruction in response to the condition in which the event occurs (e.g., YES in operation 2400).

According to the embodiment, the processor 250 may end the operation of the motor 270 without controlling the motor 270 in response to the condition in which the event of the display 220 does not occur (e.g., NO in operation 2400).

FIG. 4B is a view illustrating examples of operations of an electronic device, among the operations in FIG. 4A according to the embodiment, in response to the deactivation of a maintenance mode of a size of a display area.

According to the example in part (a) of FIG. 4B, the processor 250 may not control the operation of the motor 270 in response to the condition in which the electronic device 200 switches to the display activation state (e.g., operation 2100) by the user's fingerprint recognition operation 901, the maintenance mode is deactivated (e.g., NO in operation 2200), and the event including the instruction to change the size of the display area 221 does not occur (e.g., NO in operation 2400). Because the processor 250 does not control the operation of the motor 270, a size A0 of the display area 221 may be maintained.

In contrast, according to the example in part (b) of FIG. 4B), the processor 250 may control the motor 270 to move the second housing 213 in the first direction D1 (e.g., operation 2600) so that the display area 221 has a maximum size A3 in response to the condition in which the electronic device 200 switches to the display activation state by the user's fingerprint recognition swipe operation 902 (e.g., operation 2100), the maintenance mode is deactivated (e.g., NO in operation 2200) and in response to the user's fingerprint recognition swipe operation 902 including the instruction to expand the display area 221 (e.g., YES in operation 2400).

Figure 4C:
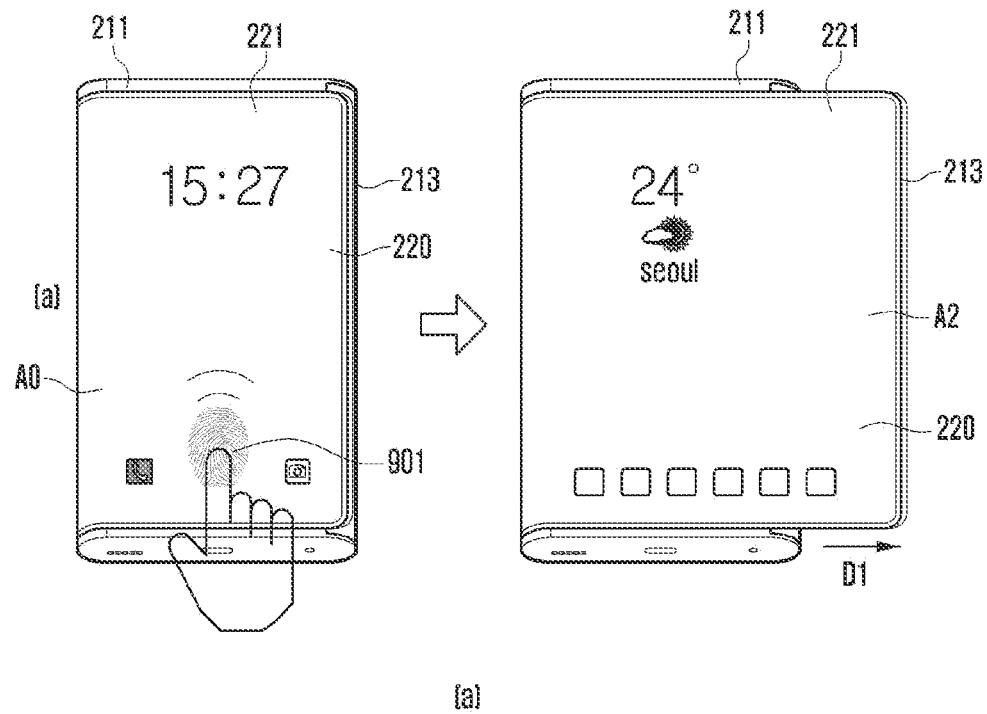
Figure 4C:
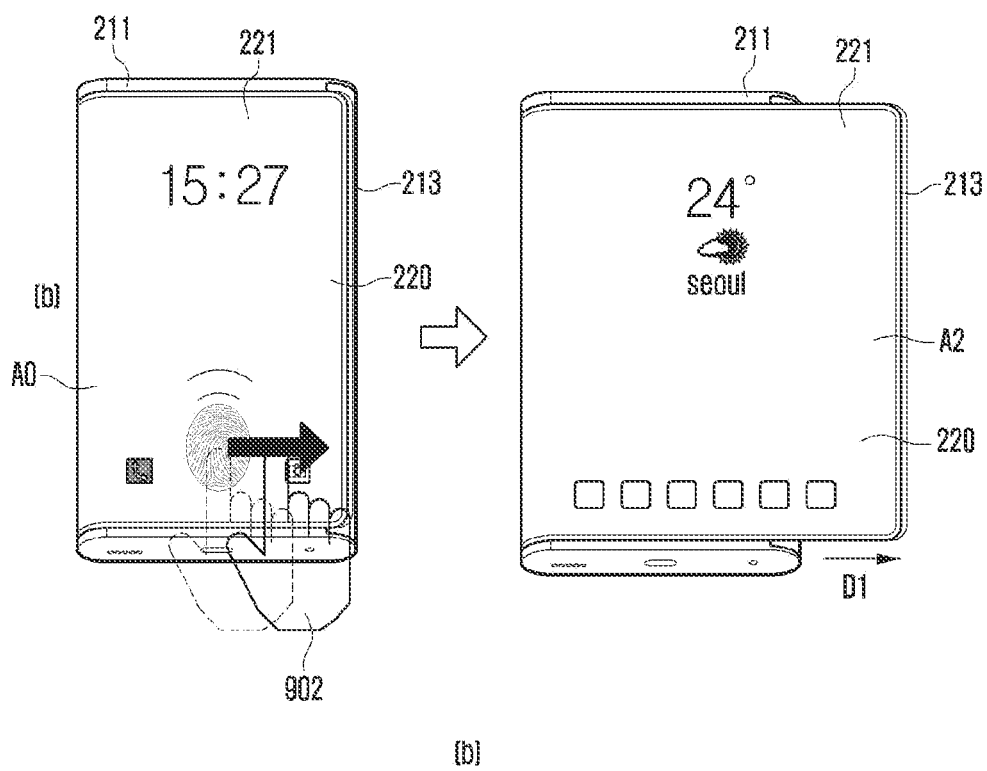

FIG. 4C is a view illustrating an operation of an electronic device, among the operations in FIG. 4A according to the embodiment, in response to the condition in which a maintenance mode in which a size of a display area is maintained is activated, and a determined size is the size of the display area when the maintenance mode is activated.

According to the example in part (a) of FIG. 4C, the processor 250 may control the motor 270 to move the second housing 213 in the first direction D1 (e.g., operation 2500) so that the size of the display area 221 has a determined size A2 because the electronic device 200 switches to the display activation state by the user's fingerprint recognition operation 901 (e.g., operation 2100), the maintenance mode is activated (e.g., YES in operation 2200), and the size A0 of the display area 221 is different from the determined size A2 (e.g., NO in operation 2300).

In addition, in the example in part (b) of FIG. 4C, the processor 250 may control the motor 270 to move the second housing 213 in the first direction D1 so that the display area 221 is expanded only by the determined size A2 without being expanded to have the maximum size (e.g., maximum size A3 in FIG. 4B) in response to the condition in which the maintenance mode is activated (e.g., YES in operation 2200 even though the user's fingerprint recognition swipe operation 902 includes the instruction to expand the display area 221.

Figure 4D:
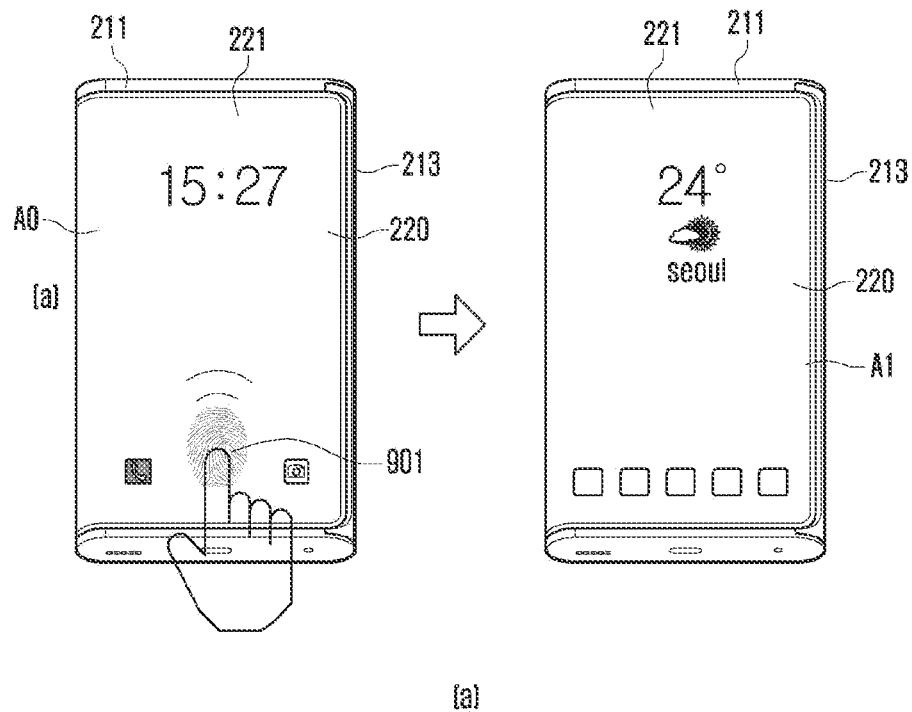
Figure 4D:
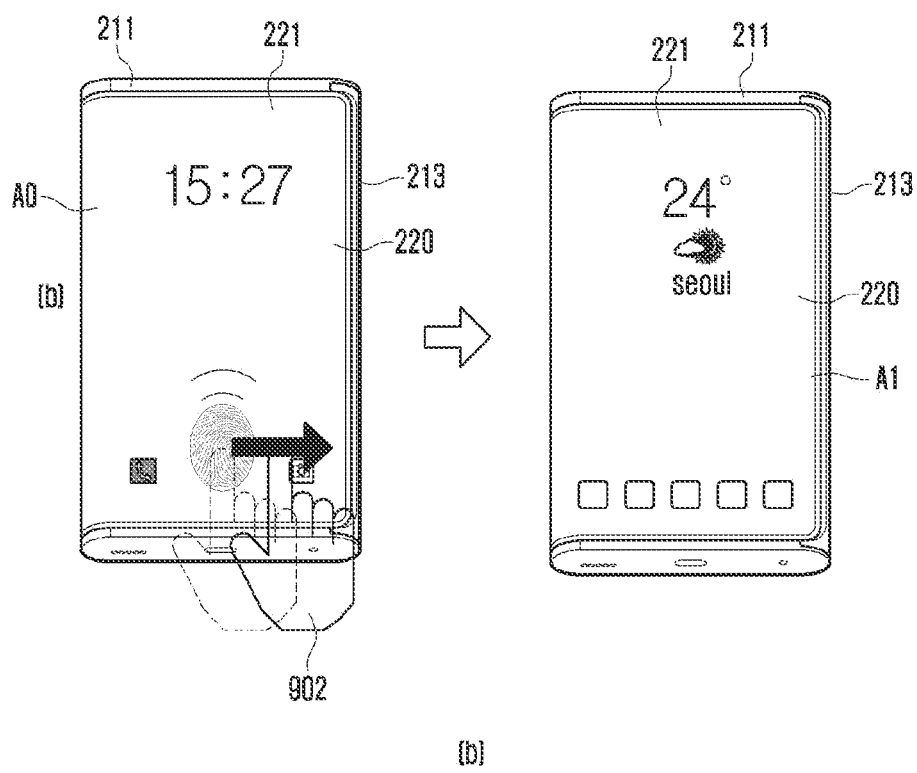

FIG. 4D is a view illustrating an example of an operation of an electronic device, among the operations in FIG. 4A according to the embodiment, in response to the condition in which a maintenance mode in which a size of a display area is maintained is activated, and a determined size corresponds to a slide-in state in which a second housing is maximally retracted, such that the size of the display area has a minimum size.

According to the example in part (a) of FIG. 4D, the processor 250 may not control the operation of the motor 270 in response to the condition in which the electronic device 200 switches to the display activation state by the user's fingerprint recognition operation 901 (e.g., operation 2100), the maintenance mode is activated (e.g., YES in operation 2200), and the size A0 of the display area 221 is equal to a designated minimum size A1 (e.g., YES in operation 2300). Because the processor does not control the operation of the motor 270, the minimum size A1 of the display area 221 may be maintained.

In addition, in the example in part (b) of FIG. 4D, the processor 250 may not control the operation of the motor 270 in response to the condition in which the size A0 of the display area 221 is equal to the designated minimum size A1 (e.g., YES in operation 2300), and the maintenance mode is activated (e.g., YES in operation 2200) even though the user's fingerprint recognition swipe operation 902 includes the instruction to expand the display area 221. Because the processor 250 does not control the operation of the motor 270, the minimum size A1 of the display area 221 may be maintained.

Figure 4E:
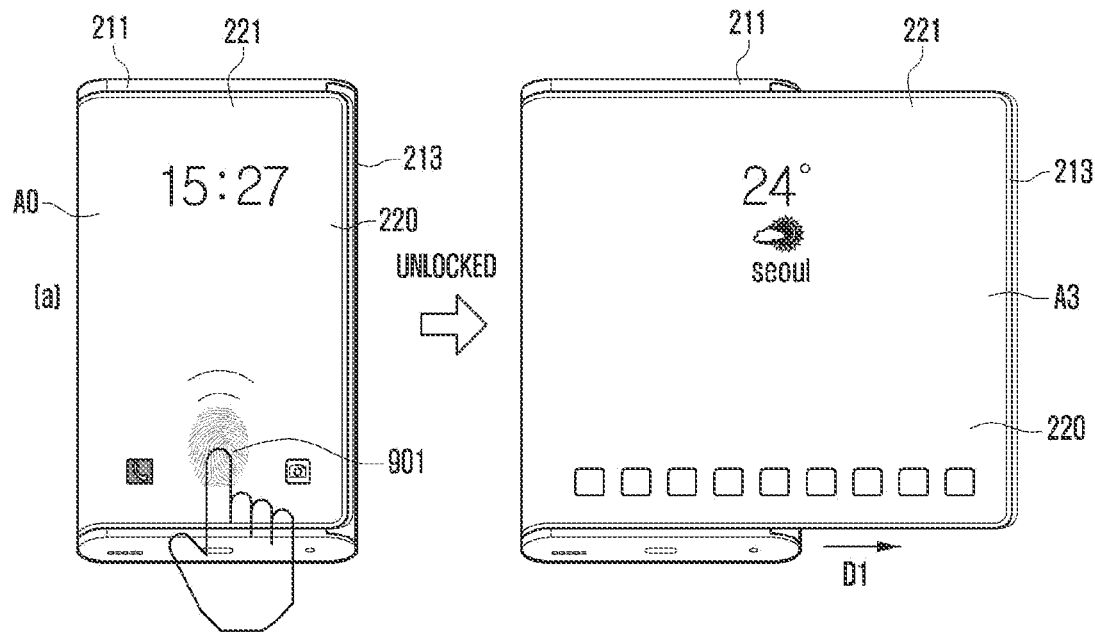
Figure 4E:
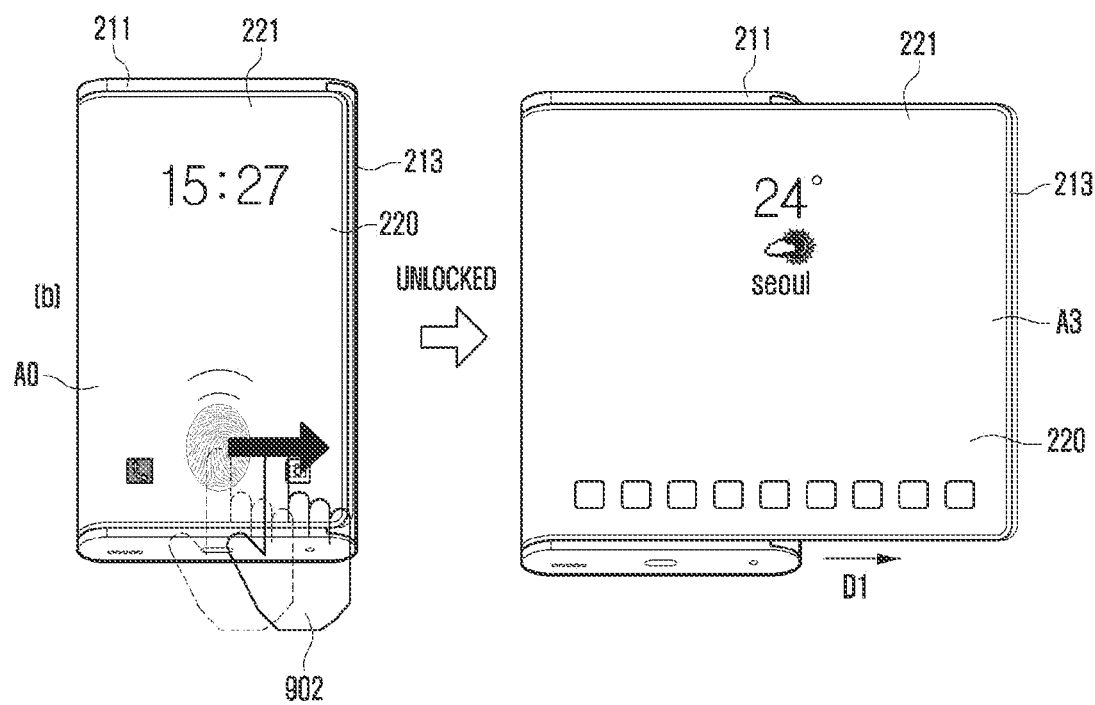

FIG. 4E is a view illustrating an example of an operation of an electronic device, among the operations in FIG. 4A according to the embodiment, in response to the condition in which a maintenance mode in which a size of a display area is maintained is activated, and a determined size corresponds to a slide-out state in which a second housing is maximally extended, such that the size of the display area has a maximum size.

According to the example in part (a) of FIG. 4E, the processor 250 may control the motor 270 to move the second housing 213 in the first direction D1 (e.g., operation 2500) so that the size of the display area 221 has the determined maximum size A3 because the electronic device 200 switches to the display activation state by the user's fingerprint recognition operation 901 (e.g., operation 2100), the maintenance mode is activated (e.g., YES in operation 2200), and the size A0 of the display area 221 is different from the determined maximum size A3 (e.g., NO in operation 2300).

In addition, in the example in part (b) of FIG. 4E, the processor 250 may control the motor 270 to move the second housing 213 in the first direction D1 (e.g., operation 2500) so that the size of the display area 221 is expanded to have the maximum size A3, which is the determined size, because the maintenance mode is activated (e.g., YES in operation 2200), and the size A0 of the display area 221 is different from the designated maximum size A3 (e.g., NO in operation 2300) regardless of the condition in which the user's fingerprint recognition swipe operation 902 includes the instruction to expand the display area 221.

Figure 5A:
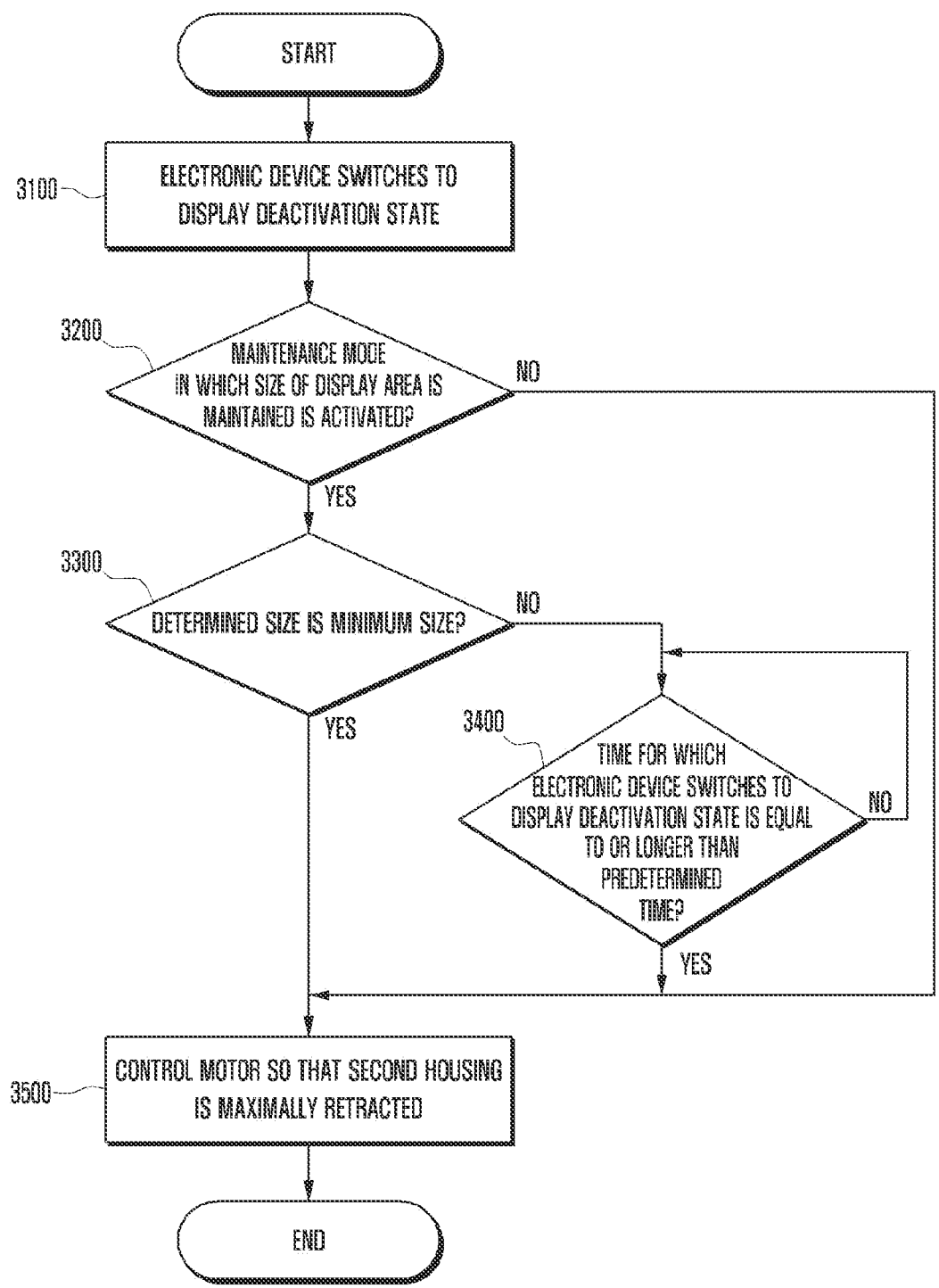
FIG. 5A is a flowchart illustrating an operation of controlling, by a processor, an electronic device in response to a condition in which the electronic device switches to a display deactivation state according to an embodiment of the disclosure.
Figure 5B:
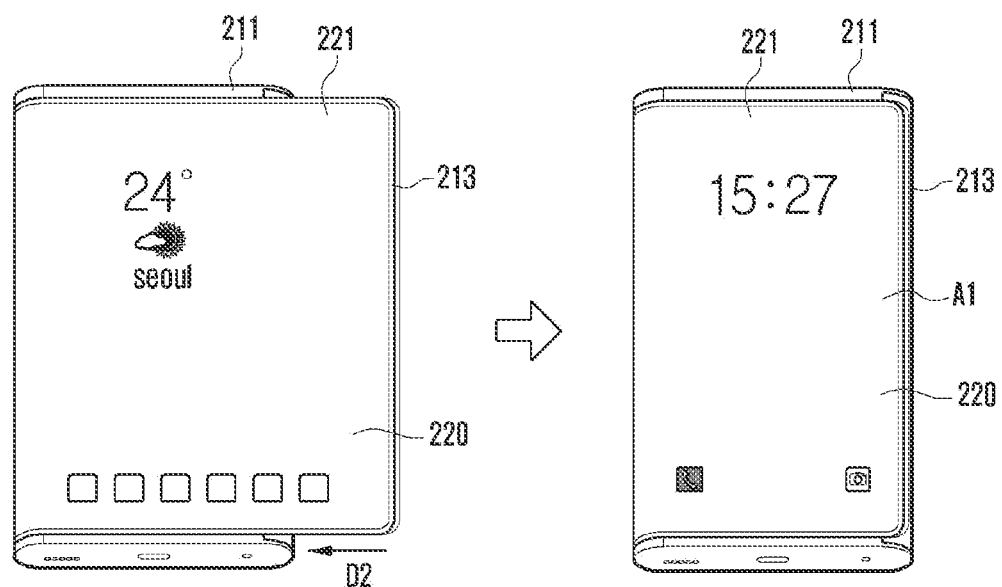
Figure 5C:
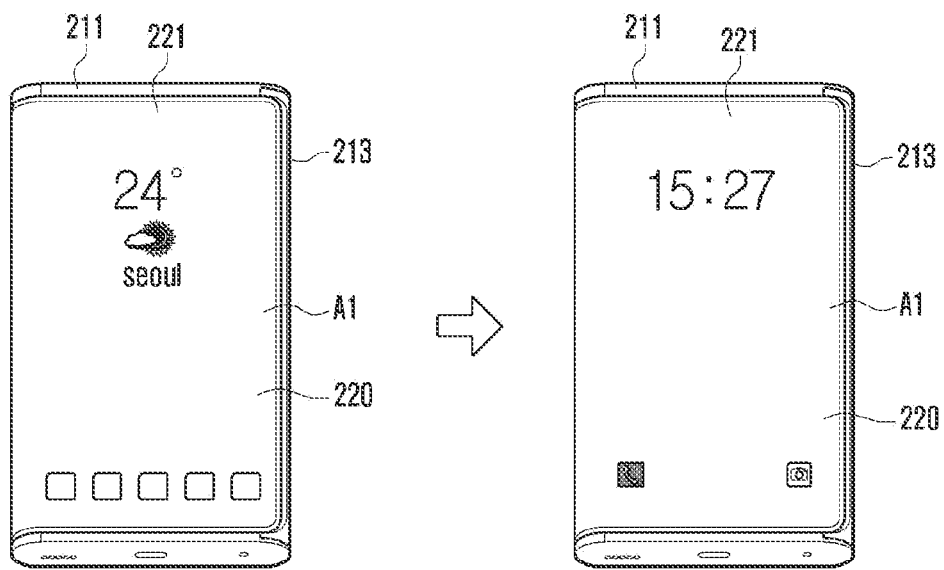

FIG. 5A is a flowchart illustrating an operation of controlling, by a processor (e.g., a processor of FIG. 2A), an electronic device (e.g., an electronic device of FIG. 2A) in response to the condition in which the electronic device switches to a display deactivation state according to an embodiment of the disclosure. FIGS. 5B, 5C, and 5D are views illustrating examples of operations of an electronic device in accordance with the flowchart in FIG. 5A according to various embodiments of the disclosure.

According to various embodiments, the processor 250 may be configured to maintain the size of the display area 221 and/or control the motor (e.g., the motor 270 in FIG. 2A) to move the second housing (e.g., the second housing 213 in FIG. 2B) on the basis of whether the maintenance mode in which the size of the display area 221 is maintained is activated in response to the condition in which the electronic device 200 switches to the display deactivation state.

For example, referring to FIG. 5A, in operation 3100, the processor 250 may determine that the electronic device 200 switches to the display deactivation state.

According to the embodiment, the electronic device 200 may switch from the display activation state to the display deactivation state in response to a situation in which a designated condition is satisfied. The designated condition may include varies conditions including: a condition in which the display does not receive a separate user input for the time equal to or longer than the time designated in the display activation state; and a condition in which the electronic device 200 receives a user input that requests the electronic device 200 to switch to the display deactivation state.

In operation 3200, the processor 250 may determine whether the maintenance mode in which the size of the display area 221 is maintained is activated in response to the condition in which the electronic device 200 switches to the display deactivation state.

According to various embodiments, in operation 3500, the processor 250 may control the motor 270 to maximally retract the second housing 213 in the second direction (e.g., second direction D2 in FIG. 2C) so that the size of the display area 221 of the display 220 is minimized in response to the condition in which the maintenance mode is deactivated (e.g., NO in operation 3200).

According to various embodiments, in operation 3300, in response to the condition in which the maintenance mode is activated (e.g., YES in operation 3200), the processor 250 may identify whether the determined size is a minimum value corresponding to a state in which the second housing 213 is maximally retracted.

In operation 3500, in response to the condition in which the determined size has the minimum value (e.g., YES in operation 3300), the processor 250 may control the motor 270 so that the second housing 213 is maximally retracted so that the size of the display area 221 is minimized.

In operation 3400, in response to the condition in which it is identified that the determined size is not the minimum value (e.g., NO in operation 3300), the processor 250 may determine whether the time for which the electronic device 200 switches to the display deactivation state is equal to or longer than a predetermined time. The predetermined time may be the time predetermined by a manufacturer at the time of manufacturing the electronic device 200 or the time predetermined by the user via a configuration application of the electronic device 200.

When the time for which the electronic device switches to the display deactivation state is shorter than the predetermined time (e.g., NO in operation 3400), the processor 250 may not control the operation of the motor 270, such that the size of the display area 221 may not be changed. For example, when the time for which the electronic device switches to the display deactivation state is shorter than the predetermined time, the processor 250 may be configured to fix the second housing 213 without controlling the operation of the motor 270. According to the embodiment, the processor 250 may repeatedly perform the determination in operation 3400 until the predetermined time is reached. The repetition interval may be the time predetermined by the manufacturer at the time of manufacturing the electronic device 200 or the time predetermined by the user via the configuration application of the electronic device 200.

In operation 3500, in response to the condition in which the time for which the electronic device switches to the display deactivation state is equal to or longer than the predetermined time (e.g., YES in operation 3400), the processor 250 may control the motor 270 so that the second housing 213 is maximally retracted in the second direction (e.g., second direction D2 in FIG. 2C) so that the size of the display area 221 of the display 220 is minimized.

FIG. 5B is a view illustrating examples of operations of an electronic device, among the operations in FIG. 5A according to the embodiment, in response to a deactivation of a maintenance mode of a size of a display area.

Referring to FIG. 5B, the processor 250 may control the motor 270 so that the second housing 213 is maximally retracted in the second direction D2 (e.g., operation 3500) so that the display area 221 has the minimum size A1 in response to the condition in which the electronic device 200 switches to the display deactivation state (e.g., operation 3100), and the maintenance mode is deactivated (e.g., NO in operation 3200).

FIG. 5C is a view illustrating examples of operations of an electronic device, among the operations in FIG. 5A according to the embodiment, in response to the condition in which a determined size is a minimum value in a state in which a maintenance mode in which a size of a display area is maintained is activated.

Referring to FIG. 5C, the processor 250 may perform control so that the motor 270 does not operate to maintain the size of the display area 221 to the minimum size A1 (e.g., operation 3500) in response to the condition in which the electronic device 200 switches to the display deactivation state (e.g., operation 3100), the maintenance mode in which the size of the display area is maintained is activated (e.g., YES in operation 3200), and it is identified that the determined size is the minimum size A1 (e.g., YES in operation 3300).

FIG. 5D is a view illustrating examples of operations of an electronic device, among the operations in FIG. 5A according to the embodiment, in response to the condition in which a maintenance mode in which a size of a display area is activated, and a determined size is not a minimum value.

Referring to FIG. 5D, the processor 250 does not control the operation of the motor, such that the size of the display area 221 is not changed (e.g., NO in operation 3400), while the time for which the electronic device 200 switches to the display deactivation state is shorter than the predetermined time, in response to the condition in which the electronic device 200 switches to the display deactivation state (e.g., operation 3100), the maintenance mode is activated (e.g., YES in operation 3200), and the designated size is not a minimum value (e.g., NO in operation 3300). In case that the time for which the electronic device 200 switches to the display deactivation state is equal to or longer than the predetermined time (e.g., YES in operation 3400), the processor may control the motor 270 so that the second housing 213 is maximally retracted in the second direction D2 so that the display area 221 has the minimum size A1 (e.g., operation 3500).

Figure 6B:
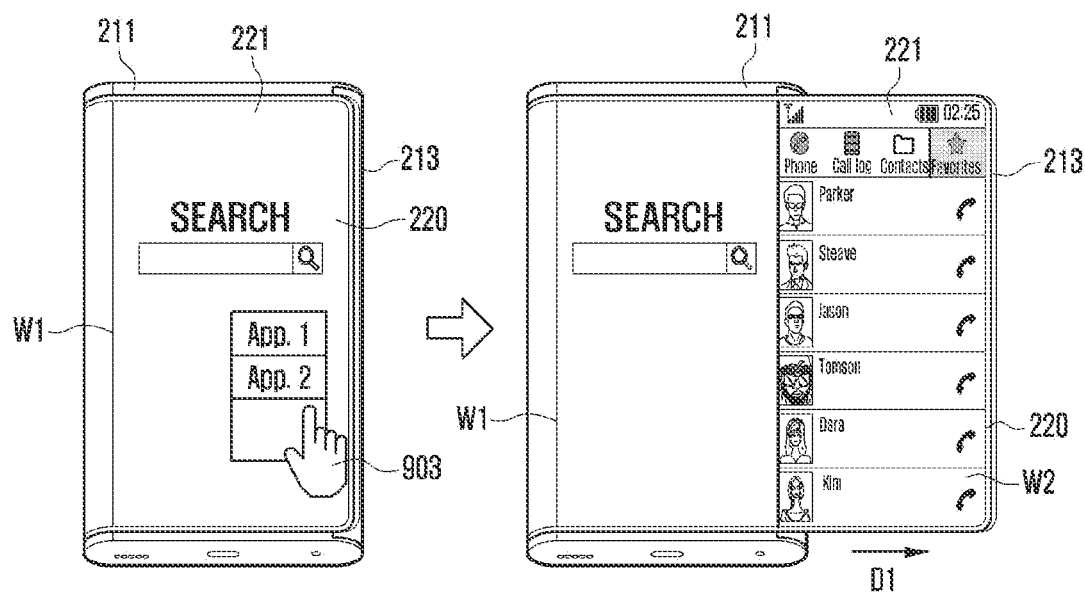
FIGS. 6B, 6C, and 6D are views illustrating examples of operations of an electronic device in accordance with the flowchart in FIG. 6A according to various embodiments of the disclosure.
Figure 6C:
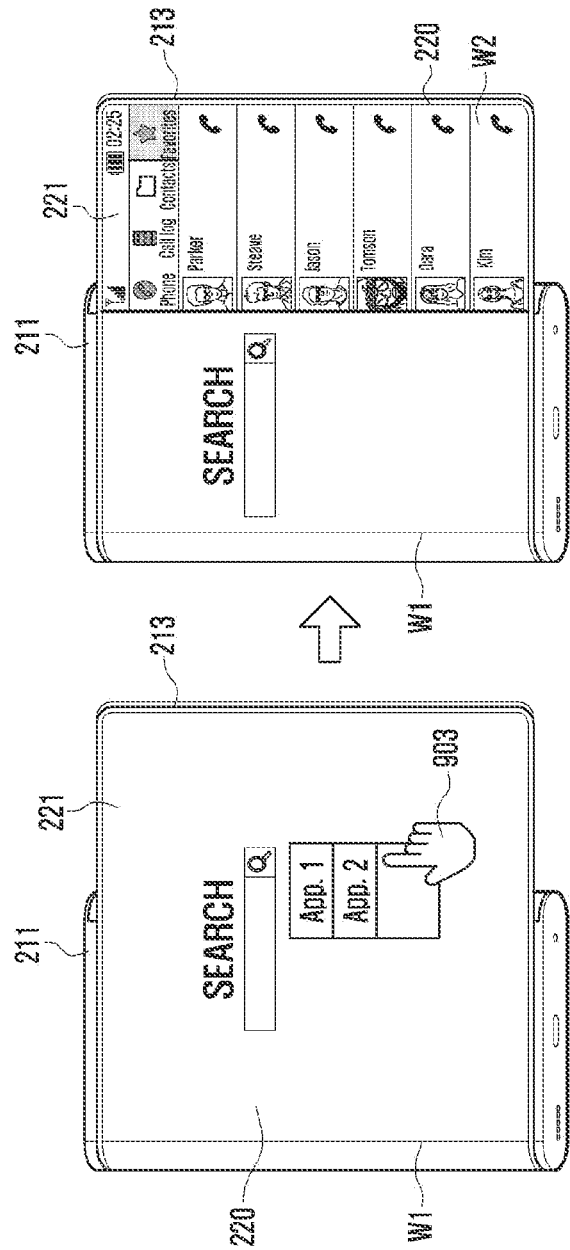
Figure 6D:
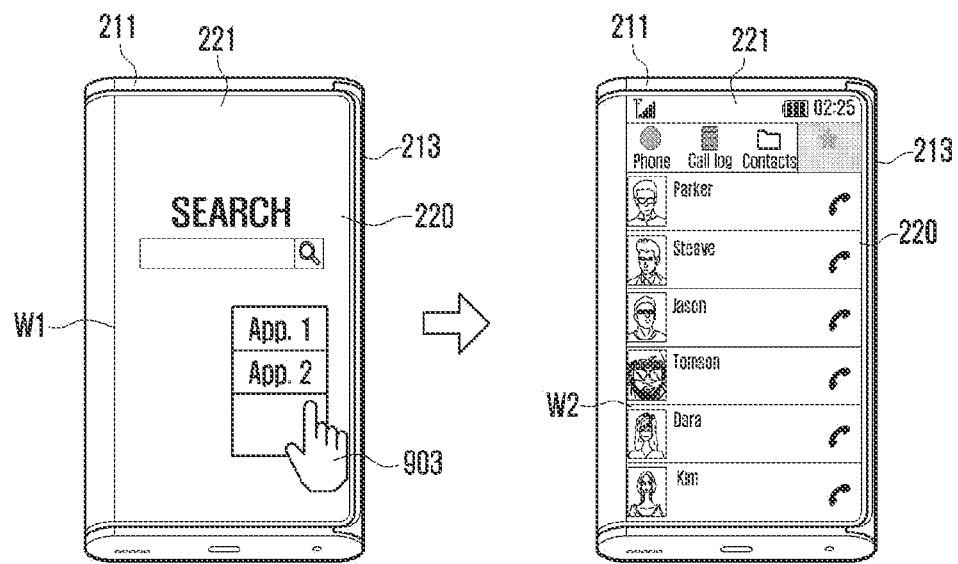

FIG. 6A is a flowchart illustrating an operation of providing, by a processor (e.g., a processor of FIG. 2A), a split screen mode in response to a condition in which an electronic device acquires a split screen execution instruction according to an embodiment of the disclosure. FIGS. 6B, 6C, and 6D are views illustrating examples of operations of an electronic device in accordance with the flowchart in FIG. 6A according to various embodiments of the disclosure.

According to various embodiments, in case that the processor 250 acquires a split screen execution instruction, the processor 250 may provide a split screen mode on the basis of the size of the display area 221 and whether the maintenance mode in which the size of the display area (e.g., the display area 221 in FIG. 2B) is maintained is activated.

For example, referring to FIG. 6A, in operation 4100, the processor 250 may acquire a split screen execution instruction.

According to the embodiment, the event including the split screen execution instruction may include: the instructions related to the split screen, the configuration, and the user's input such as a case in which the opening of the split screen is selected by the user via an application, a case in which an application registered on the edge panel is selected, a case in which a one-hand operation instruction configured to be related to the split screen is executed, and a case in which a split screen is displayed when the designated application is executed.

In operation 4200, in response to the acquisition of the instruction, the processor 250 may determine whether the maintenance mode in which the size of the display area 221 is maintained is activated.

In operation 4430, in response to the condition in which the maintenance mode is deactivated (e.g., NO in operation 4200), the processor 250 may provide the split screen mode on the basis of the instruction. According to the embodiment, in operation 4430, the processor 250 may control the motor (e.g., the motor 270 in FIG. 2A) to move the second housing 213 so that the size of the display area 221 is changed on the basis of the instruction.

In operation 4300, in response to the condition in which the maintenance mode is activated (e.g., YES in operation 4200), the processor 250 may determine whether the size of the display area 221 is equal to or larger than a predetermined size. For example, the predetermined size may mean a sufficient size capable of providing the split screen mode in accordance with the attribute of the application to be displayed. The predetermined may be configured in advance or configured by the user.

In operation 4410, in response to the condition in which the size of the display area 221 is equal to or larger than the predetermined size (e.g., YES in operation 4300), the processor 250 may provide the split screen mode. According to various embodiments, the split screen mode, i.e., the form of the displayed split screen, such as the number of split screens, a ratio between the displayed split screens, and a split direction, may be configured by the user or vary depending on attributes of the instruction.

In operation 4420, the processor 250 may not execute the split screen mode in response to the condition in which the display area 221 is equal to or smaller than the predetermined size (e.g., NO in operation 4300). According to the embodiment, the processor 250 may display only one designated application on the screen. The designated applications may be selected depending on a predetermined degree of importance and displayed on the display 220. According to another embodiment, the application, which has been executed most recently, may be displayed on the display 220.

FIG. 6B is a view illustrating examples of operations of an electronic device (e.g., an electronic device of FIG. 2A), among the operations in FIG. 6A according to the embodiment, in response to a deactivation of a maintenance mode of a size of a display area.

Referring to FIG. 6B, the processor 250 may control the motor 270 to move the second housing 213 in the expansion direction (e.g., first direction D1) on the basis of the instruction to expand the display area 221 in response to the condition in which the split screen execution instruction and the instruction to expand the display area 221 are generated on the basis of a user's multi-window operation 903 (e.g., operation 4100). Further, the split screens (e.g., a first screen W1 and/or a second screen W2) may be provided (e.g., operation 4430) in response to the condition in which the maintenance mode in which the size of the display area 221 is maintained is deactivated (e.g., NO in operation 4200).

FIG. 6C is a view illustrating examples of operations of an electronic device (e.g., an electronic device of FIG. 2A), among the operations in FIG. 6A according to the embodiment, in response to the condition in which a maintenance mode in which a size of a display area is maintained is activated, and the size of the display area is equal to or larger than a predetermined size.

Referring to FIG. 6C, the processor 250 may provide the split screens (e.g., the first screen W1 and/or the second screen W2) (e.g., operation 4410) in response to the condition in which the split screen execution instruction is generated on the basis of the user's multi-window operation 903 (e.g., operation 4100), the maintenance mode in which the size of the display area 221 is maintained is in the activation state (e.g., YES in operation 4200), and the size of the display area 221 is equal to or larger than the predetermined size (e.g., YES in operation 4300).

FIG. 6D is a view illustrating examples of operations of an electronic device, among the operations in FIG. 6A according to the embodiment, in response to the condition in which a maintenance mode in which a size of a display area is maintained is activated, and the size of the display area is smaller than a predetermined size.

Referring to FIG. 6D, the processor 250 may display only the second screen W2 without performing the split screen mode (e.g., operation 4420) in response to the condition in which the split screen execution instruction is generated on the basis of the user's multi-window operation 903 (e.g., operation 4100), the maintenance mode in which the size of the display area 221 is maintained is activated (e.g., YES in operation 4200), and the size of the display area 221 is equal to or smaller than the predetermined size (e.g., NO in operation 4300).

FIGS. 7A, 7B, 7C, 7D, and 7E are views for explaining examples of UIs included in an electronic device according to various embodiments of the disclosure. The UIs described in the document may include various UIs in the form of software and/or hardware.

The electronic device 200 may provide user interfaces (UIs) having various shapes to acquire an input from the user in respect to the maintenance mode in which the size of the display area (e.g., the display area 221 in FIG. 2B) to be the determined size.

Figure 7A:
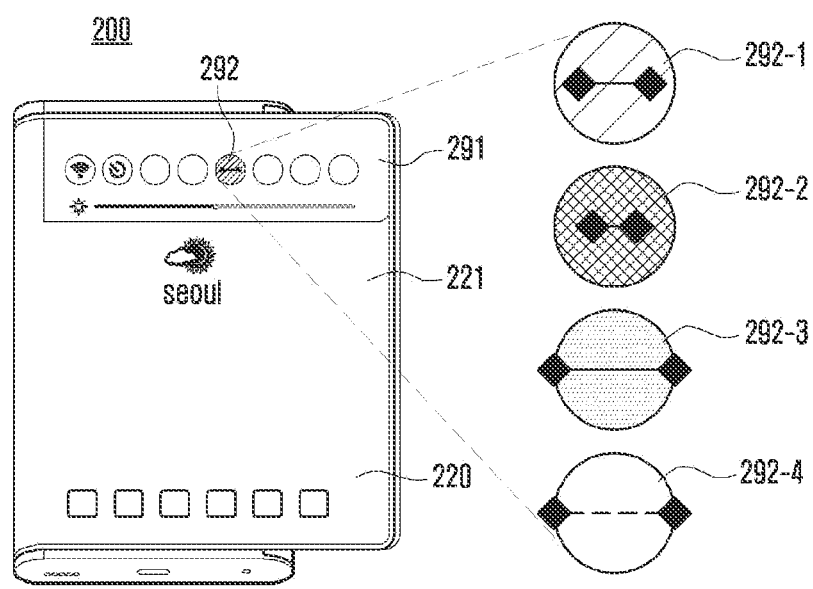
FIGS. 7A, 7B, 7C, 7D, and 7E are views illustrating UIs included in an electronic device according to various embodiments of the disclosure.

Referring to FIG. 7A, the UI, which is related to the maintenance mode in which the size of the display area 221 is maintained to be the determined size, may be provided in the form of an icon 292 in an upper end bar 291 and displayed on the display 220.

According to the embodiment, the processor 250 does not display the upper end bar 291 on the display 220 in a standby state of the electronic device 200. The processor 250 may display the upper end bar 291 at an upper end of the display area 221 of the display 220 in accordance with an input such as the user's scroll-down or touch.

According to various embodiments, the processor 250 may differently display the icons (e.g., icon 292) related to the selection of the maintenance mode in accordance with the selected mode. According to the embodiment, the processor 250 may display the icons (e.g., icon 292) having different shapes or colors depending on the selected modes.

According to various embodiments, a first icon 292-1 may be an icon that is displayed in a state in which the maintenance mode is activated, and the determined size is configured as the size of the display area 221 when the maintenance mode is activated. A second icon 292-2 may be an icon that is displayed in a state in which the maintenance mode is activated, and the determined size is configured as the size corresponding to the state in which the second housing (e.g., the second housing 213 in FIG. 2B) is maximally retracted. A third icon 292-3 may be an icon that is displayed in a state in which the maintenance mode is activated, and the determined size is configured as the size corresponding to the state in which the second housing 213 is maximally extended. A fourth icon 292-4 may be an icon that is displayed in a state in which the maintenance mode is deactivated.

According to the embodiment, in response to the condition in which an input made by pushing the icon 292 for a long time is received, the processor 250 may display at least one of the first icon 292-1, the second icon 292-2, the third icon 292-3, and the fourth icon 292-4 in a pop-up shape on the display 220. The processor 250 may receive a user input for selecting one of the first icon 292-1, the second icon 292-2, and the third icon 292-3 and activate the maintenance mode corresponding to the user input.

According to still another embodiment, the processor 250 may display the first icon 292-1 on the display 220 in response to the condition in which a touch input is received once in respect to the icon 292. The processor 250 may display the second icon 292-2 on the display 220 in response to the condition in which a touch input is received twice in respect to the icon 292. The processor 250 may display the third icon 292-3 on the display 220 in response to the condition in which a touch input is received three times in respect to the icon 292. The processor 250 may display the fourth icon 292-4 on the display 220 in response to the condition in which a touch input is received four times in respect to the icon 292. The processor 250 may activate the maintenance mode corresponding to the user input. According to yet another embodiment, the processor 250 may display the first icon 292-1 in response to the condition in which a touch input is received five times in respect to the icon 292. For example, in case that the number of types of icons (e.g., icon 292) is n, the processor may display the first icon 292-1 on the display 220 in response to the condition in which a touch input is received (n+1) times. For example, the processor may display the first icon 292-1 on the display 220 in response to the condition in which a touch input is received in respect to the fourth icon 292-4.

Figure 7B:
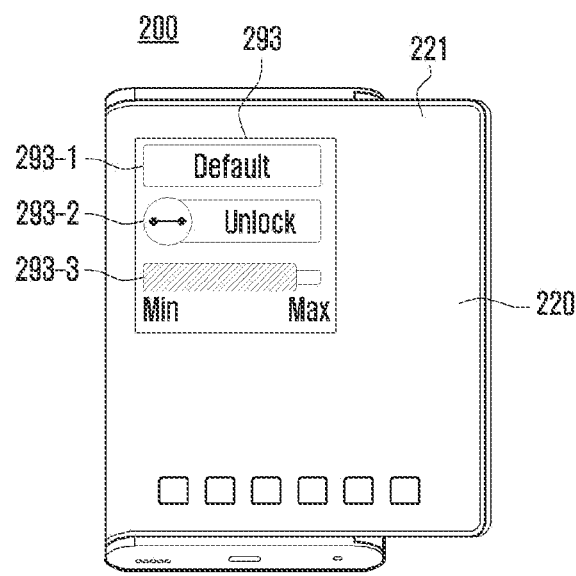

Referring to FIG. 7B, the UI, which is related to the mode in which the size of the display area 221 of the display 220 is maintained to be the determined size, may be provided in the form of a widget 293. According to the embodiment, the widget 293 may include a first widget icon 293-1, a second widget icon 293-2, and/or a third widget icon 293-3.

According to various embodiments, the processor 250 may display the first widget icon 293-1 related to a state in which the maintenance mode is activated, and the determined size is the size corresponding to the state in which the second housing 213 is maximally retracted. The processor 250 may display the second widget icon 293-2 as "lock" in respect to a state in which the maintenance mode is activated, and the determined size is the size of the display area 221 when the maintenance mode is activated. The processor 250 may display the second widget icon 293-2 as "unlock" in respect to the state in which the maintenance mode is deactivated.

The processor may display the third widget icon 293-3 in the form of a bar related to the adjustment of the display area 221 of the display 220 so that the bar may move in a transverse direction to adjust the display area 221. For example, the processor 250 may expand the display area 221 by moving the second housing 213 in the extension direction in accordance with an input for moving the third widget icon 293-3 in a rightward direction. The processor 250 may contract the display area 221 by moving the second housing 213 in the retraction direction in accordance with an input for moving the third widget icon 293-3 in a leftward direction. According to various embodiments, the UI provided in the form of a widget may have various shapes in accordance with the user's preference without being limited to the shape illustrated in FIG. 7B.

Figure 7C:
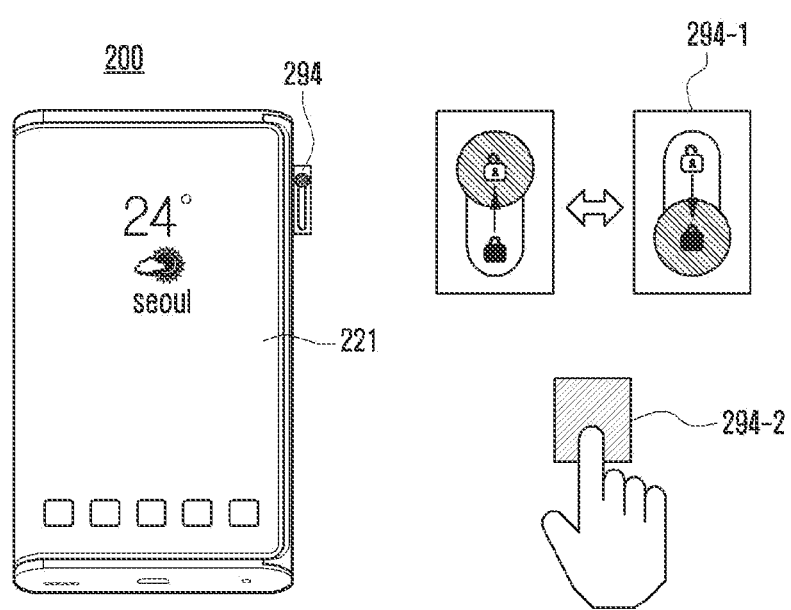

Referring to FIG. 7C, the UI, which is related to the mode in which the size of the display area 221 is maintained to be the determined size, may be provided in the form of a hardware key 294 provided on the electronic device 200. According to various embodiments, the hardware key 294 may be disposed on at least one of the side surface, the front surface, and/or the rear surface of the electronic device 200 without being limited to the position illustrated in FIG. 7C.

According to the embodiment, the hardware key 294 may be an on/off type switch 294-1. For example, a state in which the switch 294-1 is in a switch-on state in the first direction may correspond to the state in which the maintenance mode is activated. A state in which the switch 294-1 is in a switch-off state in the second direction may correspond to the state in which the maintenance mode is deactivated.

According to still another embodiment, the hardware key 294 may be a button 294-2. For example, a state in which the button 294-2 is clicked and turned on may correspond to the state in which the maintenance mode is activated. A state in which the button 294-2 is turned off may correspond to the state in which the maintenance mode is deactivated.

Figure 7D:
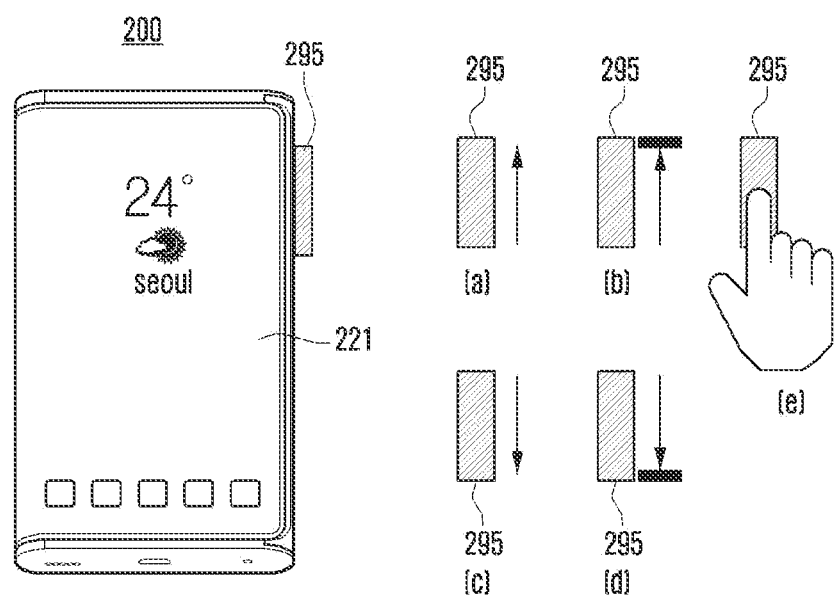

Referring to FIG. 7D, the UI related to the maintenance mode in which the size of the display area is maintained to be the determined size may be provided in the form of a touch pad 295 provided on the electronic device 200. According to various embodiments, the touch pad 295 may be disposed on at least one of the side surface, the rear surface, the front surface, and the lower surface of the electronic device 200 without being limited to the position illustrated in FIG. 7D.

Referring to part (a) of FIG. 7D, the processor 250 may control the motor 270 to move the second housing (e.g., the second housing 213 in FIG. 2B) by a predetermined size in the extension direction in response to the condition in which a sliding touch in the first direction (e.g., upward direction) is received through the touch pad 295. The display area may be expanded by the predetermined size as the second housing 213 is moved by the predetermined size. In addition, referring to part (b) of FIG. 7D, the processor 250 may control the motor 270 to continuously move the second housing 213 in the extension direction until the second housing 213 is maximally extended in response to the condition in which a long touch is received through the touch pad 295 after the sliding motion in the first direction (e.g., upward direction). The display area 221 may be continuously expanded as the second housing 213 is continuously moved. Likewise, referring to part (c) of FIG. 7D, the processor 250 may control the motor 270 to move the second housing 213 by a predetermined size in the retraction direction in response to the condition in which a sliding touch in the second direction (e.g., downward direction) is received through the touch pad 295. The display area 221 may be contracted by the predetermined size as the second housing 213 is moved by the predetermined size. Referring to part (d) of FIG. 7D, the processor 250 may control the motor 270 to continuously move the second housing 213 in the retraction direction until the second housing 213 is maximally retracted in response to the condition in which a long touch is received through the touch pad 295 after the sliding motion in the second direction (e.g., downward direction). The display area 221 may be continuously contracted as the second housing 213 is continuously moved. Referring to part (e) of FIG. 7D, the processor 250 may activate the maintenance mode in response to the condition in which a click input is received through the touch pad 295. The operation made by the motion using the touch pad 295 may be configured by the user or may be a mode configured by the manufacturer at the time of manufacturing the touch pad 295. According to the embodiment, the click input of the touch pad 295 may include a double click, a multi-touch, and/or a designated gesture input. For example, the maintenance mode may be activated in response to the condition in which a double click input is received through the touch pad 295.

Figure 7E:
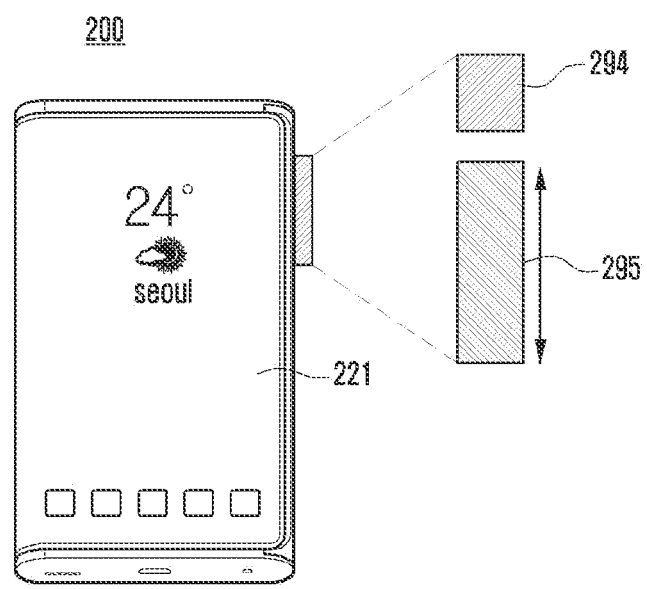

Referring to FIG. 7E, the UI, which is related to the mode in which the size of the display area 221 of the display 220 is maintained to be the determined size, may be provided in the form of a combination of the touch pad 295 and/or the hardware key 294 provided on the electronic device 200. According to various embodiments, the touch pad 295 and the hardware key 294 may be positioned on at least one of the side surface, the rear surface, the front surface, and the lower surface of the electronic device 200 without being limited to the position illustrated in FIG. 7E.

According to the embodiment, the touch pad 295 may be the UI related to the contraction and/or expansion of the display area 221 of the display 220. For example, the processor 250 may control the motor 270 to continuously move the second housing 213 in the extension direction until the second housing 213 is maximally extended in response to the condition in which a long touch is received through the touch pad 295 after the sliding motion in the first direction (e.g., upward direction). The processor 250 may control the motor 270 to move the second housing 213 by a predetermined size in the retraction direction in response to the condition in which a sliding touch in the second direction (e.g., downward direction) is received through the touch pad 295. The processor 250 may control the motor 270 to continuously move the second housing 213 in the retraction direction until the second housing 213 is maximally retracted in response to the condition in which a long touch is received through the touch pad 295 after the sliding motion in the second direction (e.g., downward direction). In response to the condition in which an upward sliding touch is inputted to the touch pad 295, the second housing (e.g., the second housing 213 in FIG. 2B) may be moved by the predetermined size in the extension direction, and the display area 221 of the display 220 may be expanded by the predetermined size. In addition, in response to the condition in which a long touch is inputted to the touch pad 295 after an upward sliding motion, the second housing may be continuously moved in the extension direction, and the display area 221 of the display 220 may be continuously expanded until the second housing is maximally extended. Likewise, in response to the condition in which a downward sliding touch is inputted to the touch pad 295, the second housing 213 may be moved by the predetermined size in the retraction direction, and the display area 221 of the display 220 may be contracted by the predetermined size. In response to the condition in which a long touch is inputted to the touch pad 295 after the downward sliding motion, the second housing may be continuously moved in the retraction direction, and the display area 221 of the display 220 may be continuously contracted until the second housing is maximally retracted.

According to the embodiment, the hardware key 294 may be the UI related to the mode in which the size of the display area 221 of the display 220 is maintained to be the determined size. For example, the maintenance mode may be activated in response to the condition in which the hardware key 294 is clicked and turned on, and the maintenance mode may be deactivated in response to the condition in which the hardware key 294 is turned off.

Figure 8:
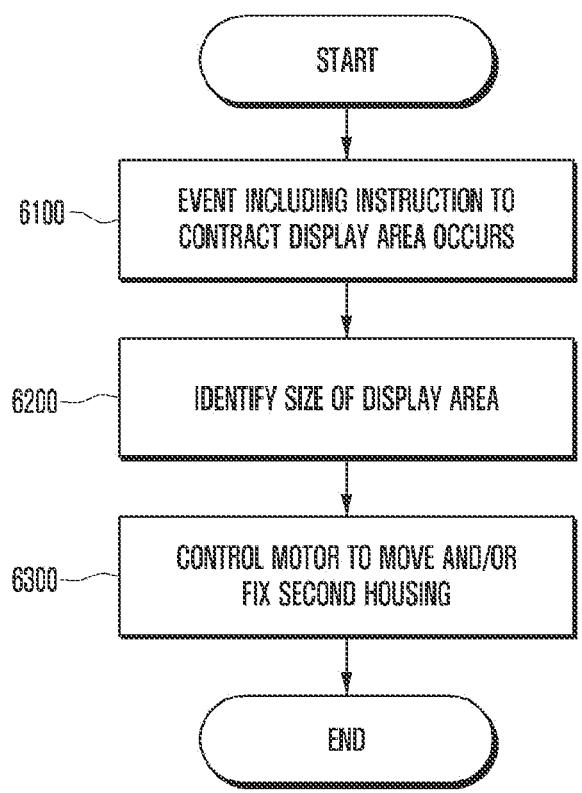
FIG. 8 is a flowchart illustrating a method of controlling, by a processor, an electronic device according to an embodiment of the disclosure.

FIG. 8 is a flowchart illustrating a method of controlling, by a processor (e.g., a processor of FIG. 2B), an electronic device (e.g., an electronic device of FIG. 2B) according to an embodiment of the disclosure.

According to various embodiments, the electronic device 200 may include a rollable type and/or slidable type electronic device in which the display area (e.g., the display area 221 in FIG. 2B) of the display (e.g., the display module 160 in FIG. 2B) is expanded or contracted by the movement of the second housing (e.g., the second housing 213 in FIG. 2B) from the first housing (e.g., the first housing 211 in FIG. 2B).

Referring to FIG. 8, according to various embodiments, in operation 6100, the processor 250 may identify a designated input including an instruction to contract the display area 221.

For example, the designated input may include the selection of a groove button including a display deactivation instruction for the electronic device 200. The shapes of the groove buttons may include the UIs having various shapes and illustrated in FIGS. 9A and 9B.

According to the embodiment, in operation 6200, the processor 250 may identify the size of the display area 221 of the display 220.

According to the embodiment, in operation 6300, the processor 250 may control the motor on the basis of the identification to move and/or fix the second housing 213 so that the second housing 213 is in a maximally retracted state. For example, in response to the condition in which it is identified that the input and the size of the display area 221 are not the size corresponding to the state in which the second housing 213 is maximally retracted, the processor 250 may control the motor to move the second housing 213 in the state in which the second housing 213 is maximally retracted. According to the embodiment, in response to the condition in which the input and the size of the display area 221 are the size corresponding to the state in which the second housing 213 is maximally retracted, the processor 250 may end the operation of the motor without controlling the operation of the motor.

Figure 9A:
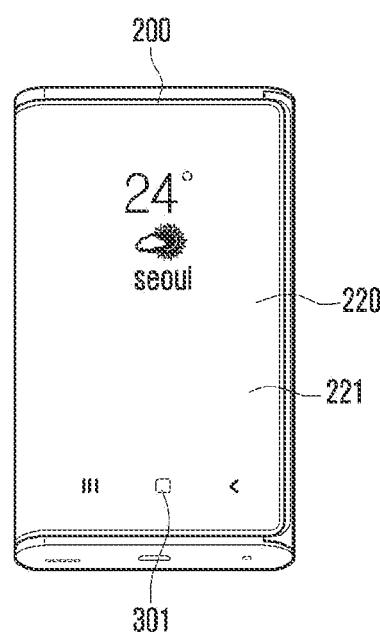
FIGS. 9A and 9B are views for explaining examples of UIs included in an electronic device according to various embodiments of the disclosure.
Figure 9B:
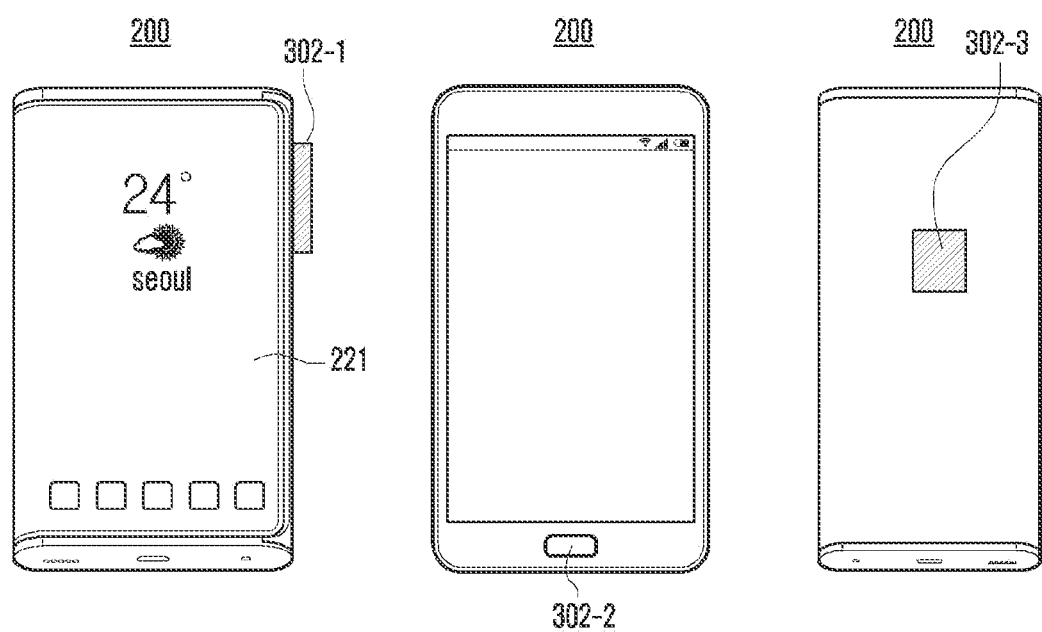

FIGS. 9A and 9B are views for explaining examples of UIs included in an electronic device according to various embodiments of the disclosure.

Referring to FIG. 9A, the UI related to the designated input in FIG. 8 may be provided in the form of a groove button 301 displayed on the display 220. The groove button 301 may be displayed on the display 220 and selected as a screen touch input in the corresponding area.

Referring to FIG. 9B, the UIs related to the designated input in FIG. 8 may be provided in the form of hardware buttons 302-1, 302-2, and 302-3 provided on the electronic device 200 and having various shapes. The hardware button 302-1 may be provided on the side surface of the electronic device 200, the hardware button 302-2 may be provided on the front surface of the electronic device 200, and the hardware button 302-3 may be provided on the rear surface of the electronic device 200. The position at which the hardware button is provided is not limited to the position illustrated in FIG. 9B.

An electronic device according to various embodiments includes: a first housing; a second housing configured to be movable relative to the first housing; a motor configured to move the second housing so that the second housing is retracted and/or extended relative to the first housing; a display configured to display a display area having a size that varies depending on a movement of the second housing; and a processor operatively connected to the display and the motor, in which the processor is configured to: identify whether a maintenance mode in which a size of the display area is maintained to be a determined size is activated; control the motor to move the second housing in accordance with a state of the electronic device in response to deactivation of the maintenance mode; and maintain the size of the display area as the determined size in response to activation of the maintenance mode.

In the electronic device according to various embodiments, the processor may configure the determined size so that the determined size has the same value as the size of the display area when the maintenance mode is activated.

In the electronic device according to various embodiments, when the maintenance mode is activated, the processor may be configured to control the motor to move the second housing so that the size of the display area is equal to the determined size in response to a condition in which it is identified that the size of the display area is different from the determined size.

In the electronic device according to various embodiments, the processor may be configured to fix the second housing in response to a condition in which the state of the electronic device switches to a display deactivation state.

In the electronic device according to various embodiments, in response to a condition in which the time for which the electronic device switches to the display deactivation state is equal to or longer than a designated time, the processor may be configured to control the motor to move the second housing to decrease the size of the display area.

In the electronic device according to various embodiments, the processor may be configured to control the motor so that the second housing is maximally retracted.

In the electronic device according to various embodiments, in response to a condition in which a request for performing a split screen mode is detected, the processor may be configured: to identify whether the determined size is equal to or larger than the determined size; to perform the split screen mode in response to a condition in which the determined size is equal to or larger than the determined size; and not to perform the split screen mode in response to a condition in which the determined size is smaller than the determined size.

In the electronic device according to various embodiments, the processor may configure the determined size so that the determined size is a size corresponding to the state in which the second housing is maximally retracted.

In the electronic device according to various embodiments, the processor may configure the determined size so that the determined size is a size corresponding to the state in which the second housing is maximally extended.

The electronic device according to various embodiments may include a sensor module configured to detect whether a movement of the second housing in an extension and/or retraction direction is obstructed, in which the processor is configured to prevent the movement of the second housing in case that the sensor module detects that the movement of the second housing is obstructed.

The electronic device according to various embodiments may include: a user interface for configuring the maintenance mode, in which the processor is configured to activate and/or deactivate the maintenance mode in response to a condition in which a designated user input is received through the user interface.

In the electronic device according to various embodiments, the user interface may include an upper end bar configured to be displayed at an upper end of the display area and including an icon for receiving the user input, and the processor may differently display a shape and/or color of the icon on the basis of the user input related to the maintenance mode.

In the electronic device according to various embodiments, the user interface may include a widget configured to be displayed in the display area and including a first icon and/or a second icon for receiving the user input, and the processor may display the first icon on the basis of the user input related to the activation of the maintenance mode and display the second icon on the basis of the user input related to a change in size of the display area.

In the electronic device according to various embodiments, the user interface may include a hardware key provided on the electronic device, and in which the processor performs the activation in response to a condition in which the hardware key is in a first state, and the processor performs the deactivation in response to a condition in which the hardware key is in a second state.

In the electronic device according to various embodiments, the user interface may include a touch pad provided on the electronic device, and the processor may be configured to: control the motor to move the second housing in an extension direction in response to a condition in which a sliding touch in a first direction is inputted to the touch pad; control the motor to move the second housing in a retraction direction in response to a condition in which a sliding touch in a second direction is inputted to the touch pad; and activate and/or deactivate the maintenance mode in response to a condition in which a click is inputted to the touch pad.

A method of operating an electronic device according to various embodiments may include: an operation of identifying whether a maintenance mode in which a size of a display area is maintained to be a determined size is activated, the size of the display area being configured to be changed in accordance with a movement of a second housing configured to be retracted and/or extended relative to a first housing; an operation of controlling a motor to move the second housing in order to move the second housing in accordance with a state of the electronic device in response to deactivation of the maintenance mode; and an operation of maintaining the size of the display area as the determined size in response to activation of the maintenance mode.

An electronic device according to various embodiments includes: a first housing; a second housing configured to be movable relative to the first housing; a motor configured to move the second housing so that the second housing is retracted and/or extended relative to the first housing; a display configured to display a display area having a size that varies depending on a movement of the second housing; and a processor operatively connected to the display and the motor, in which the processor is configured to: identify a designated input including an instruction to contract the display area; and control the motor to move and/or fix the second housing so that the second housing is maximally retracted in response to the designated input.

In the electronic device according to various embodiments, the processor may include an instruction to switch the electronic device to a display deactivation state in the designated input.

The electronic device according to various embodiments may include a user interface configured to receive the designated input, in which the processor is configured to control the motor to move and/or fix the second housing so that the second housing is maximally retracted in response to a condition in which a designated user input is received through the user interface.

A method of operating an electronic device according to various embodiments may include: an operation of identifying a designated input including an instruction to contract a display area having a size that varies depending on a movement of a second housing configured to be retracted and/or extended relative to a first housing; and an operation of moving and/or fixing the second housing so that the second housing is maximally retracted in response to the designated input.

Further, the embodiments disclosed in the document disclosed in the specification and illustrated in the drawings are provided as particular examples for easily explaining the technical contents according to the embodiment of the disclosure and helping understand the embodiment disclosed in the document, but not intended to limit the scope of the embodiment disclosed in the document.

Accordingly, the scope of the various embodiments of the disclosure should be interpreted as including all alterations or modifications derived from the technical spirit of the various embodiments of the disclosure in addition to the embodiments disclosed herein.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing configured to be movable relative to the first housing;
   a motor configured to move the second housing so that the second housing is retracted or extended relative to the first housing;
   a display configured to display a display area having a size that varies depending on a movement of the second housing;
   memory storing one or more computer programs; and
   one or more processors communicatively coupled to the display, the motor and the memory,
   wherein the one or more computer programs include computer-executable instructions that, when executed by the one or more processors individually or collectively, cause the electronic device to:
      in response to receiving a first designated input, switch from a display deactivation state to a display activation state, the display deactivation state comprises a state of screen-off, a state of being displayed screen-lock screen or a state of power-off of the electronic device,
      control, in case that a mode in which a size of a display area is maintained at a determined size is activated and the size of the display area is different from the determined size, the motor to move the second housing so that the size of the display area is equal to the determined size, and
      maintain, in case that the mode is activated and the size of the display area is equal to the determined size, the size of the display area.

2. The electronic device of claim 1, wherein the one or more computer programs further include computer-executable instructions that, when executed by the one or more processors individually or collectively, cause the electronic device to:
   maintain, when a state of the electronic device switches to the display deactivation state, a position of the second housing relative to the first housing.

3. The electronic device of claim 2, wherein the one or more computer programs further include computer-executable instructions that, when executed by the one or more processors individually or collectively, cause the electronic device to:
   control, in case that an amount of time in which the electronic device is in the display deactivation state is equal to or longer than a second designated time, the motor to move the second housing to decrease the size of the display area.

4. The electronic device of claim 3, wherein the one or more computer programs further include computer-executable instructions that, when executed by the one or more processors individually or collectively, cause the electronic device to:
   control the motor so that the second housing is maximally retracted.

5. The electronic device of claim 1, wherein the one or more computer programs further include computer-executable instructions that, when executed by the one or more processors individually or collectively, cause the electronic device to:
   identify, in case that a request for performing a split screen mode is detected, identify whether the size of the display area is equal to or larger than the determined size,
   perform, in case that the size of the display area is equal to or larger than the determined size, the split screen mode, and
   refrain from performing the split screen mode when the size of the display area is smaller than the determined size.

6. The electronic device of claim 5,
   wherein the determined size is designated by a user, and
   wherein the determined size is a size between a slide-in state, in which the second housing is maximally retracted, and a slide-out state in which the second housing is maximally extended.

7. The electronic device of claim 1, further comprising:
   a sensor circuit configured to detect whether the movement of the second housing in at least one of an extension or retraction direction is obstructed,
   wherein the one or more computer programs further include computer-executable instructions that, when executed by the one or more processors individually or collectively, cause the electronic device to:
      based on the sensor circuit detecting that the movement of the second housing is obstructed, prevent the movement of the second housing.

8. The electronic device of claim 1, further comprising:
   a user interface for configuring the mode,
   wherein the one or more computer programs further include computer-executable instructions that, when executed by the one or more processors individually or collectively, cause the electronic device to:
      perform, in case that a second designated user input is received through the user interface, to activate or to deactivate the mode.

9. The electronic device of claim 8,
   wherein the user interface comprises an upper end bar being displayed at an upper end of the display area and comprising an icon for receiving the second designated user input, and
   wherein the one or more computer programs further include computer-executable instructions that, when executed by the one or more processors individually or collectively, cause the electronic device to:
      based on the second designated user input being related to the mode, differently display at least one of a shape or a color of the icon.

10. The electronic device of claim 8,
    wherein the user interface further comprises a widget configured to be displayed in the display area,
    wherein the widget comprises at least one of a first icon or a second icon for receiving the second designated user input, and
    wherein the one or more computer programs further include computer-executable instructions that, when executed by the one or more processors individually or collectively, cause the electronic device to:

display the first icon based on the second designated user input being related to the activation of the mode, and display the second icon based on the second designated user input being related to a change in size of the display area.

11. The electronic device of claim 8, wherein the user interface further comprises a hardware key provided on the electronic device, and wherein the one or more computer programs further include computer-executable instructions that, when executed by the one or more processors individually or collectively, cause the electronic device to:

activate, in case that the hardware key is in a first state the mode, and deactivate, in case that the hardware key is in a second state the mode.

12. The electronic device of claim 8, wherein the user interface further comprises a touch pad provided on the electronic device, and wherein the one or more computer programs further include computer-executable instructions that, when executed by the one or more processors individually or collectively, cause the electronic device to:

control, in case that a sliding touch in a first direction is inputted to the touch pad, control the motor to move the second housing in an extension direction, control, in case that the sliding touch in a second direction is inputted to the touch pad, control the motor to move the second housing in a retraction direction, and perform, in case that a click is inputted to the touch pad, to activate or to deactivate the mode.

13. An electronic device comprising:

a first housing;

a second housing configured to be movable relative to the first housing;

a motor configured to move the second housing so that the second housing is at least one of retracted or extended relative to the first housing;

a display configured to display a display area having a size that varies depending on a movement of the second housing;

memory storing one or more computer programs; and one or more processors communicatively coupled to the display, the motor and the memory, wherein the one or more computer programs include computer-executable instructions that, when executed by the one or more processors individually or collectively, cause the electronic device to:

identify a designated input is received on a user interface displayed on a predetermined area, wherein the user interface comprises an icon among a plurality of different icons that define various sizes of contraction or expansion of the display area, and control, in case of selecting the icon, the motor to adjust a size of the display area to a size indicated by the selected icon.

14. The electronic device of claim 13, wherein the one or more computer programs further include computer-executable instructions that, when executed by the one or more processors individually or collectively, cause the electronic device to, based on the designated input, switch the electronic device to a display deactivation state.

15. The electronic device of claim 13, wherein the user interface comprises an icon disposed in an upper end bar displayed on the display.

16. The electronic device of claim 13, wherein the user interface comprises a touch pad disposed on at least one of a side surface, a rear surface, a front surface, or a lower surface of the electronic device.

17. The electronic device of claim 13, wherein the user interface comprises a combination of a touch pad and a hardware key, and wherein the touch pad and the hardware key are positioned on at least one of a side surface, a rear surface, a front surface, or a lower surface of the electronic device.

* * * * *